United States Patent [19]
Acheson et al.

[11] Patent Number: 5,298,710
[45] Date of Patent: Mar. 29, 1994

[54] LARGE BORE WELDING APPARATUS

[75] Inventors: Rees Acheson; Thomas H. Esslinger, both of Alstead, N.H.

[73] Assignee: Bortech Corporation, Alstead, N.H.

[21] Appl. No.: 856,573

[22] Filed: Mar. 24, 1992

[51] Int. Cl.$^5$ ............................................... B23K 9/04
[52] U.S. Cl. ............................ 219/76.14; 219/125.11; 403/314
[58] Field of Search ............... 219/76.14, 60 A, 61, 219/60 R, 125.11; 403/314, 324, 325

[56] References Cited

U.S. PATENT DOCUMENTS

| | | |
|---|---|---|
| 2,044,950 | 6/1936 | Mellinkoff . |
| 2,259,976 | 10/1941 | Howard . |
| 2,839,663 | 6/1958 | McCollom . |
| 2,880,305 | 3/1959 | Baird . |
| 2,903,566 | 9/1959 | Launder et al. . |
| 2,912,562 | 11/1959 | Donovan . |
| 3,209,119 | 9/1965 | Keidel et al. ...................... 219/60 A |
| 3,248,515 | 4/1966 | Gorman et al. . |
| 3,271,554 | 9/1966 | Johnson . |
| 3,275,795 | 9/1966 | Bosna et al. . |
| 3,536,886 | 10/1970 | Juelg et al. . |
| 3,568,029 | 3/1971 | Bollinger . |
| 3,627,973 | 12/1971 | Smith . |
| 3,689,979 | 9/1972 | Palat . |
| 3,752,951 | 8/1973 | Kniepkamp . |
| 3,769,486 | 10/1973 | Braucht . |
| 3,795,785 | 3/1974 | Smith . |
| 3,815,807 | 6/1974 | Bartley . |
| 3,821,840 | 7/1974 | Kershaw . |
| 3,945,752 | 3/1976 | Bennett . |
| 3,978,310 | 8/1976 | Gleason . |

(List continued on next page.)

FOREIGN PATENT DOCUMENTS

| | | |
|---|---|---|
| 0088305A2 | 9/1983 | European Pat. Off. . |
| 0100465A1 | 2/1984 | European Pat. Off. . |
| 2605841 | 8/1976 | Fed. Rep. of Germany . |
| 121885 | 9/1976 | Fed. Rep. of Germany . |
| 127153 | 9/1977 | Fed. Rep. of Germany . |
| WO88/03852 | 6/1988 | PCT Int'l Appl. . |
| 637227 | 12/1978 | U.S.S.R. . |

OTHER PUBLICATIONS

C. C. Peck Company Circular "Line Welds 1000 Tanks Per Shift", Reprinted from *Tooling & Production Magazine*, Jan. 1979.
C. C. Peck Company Circular "Plasma Arc Valve Surfacing", Reprinted from *Tooling & Production Magazine*, Dec. 1975.
C. C. Peck Company Circular "Applied Welding", *Welding Engineer*, Mar. 1974.
C. C. Peck Company Brochure "Peck Spud Welders."
C. C. Peck Company Brochure "Peck Welders."
C. C. Peck Company Brochure "Peck Spudette."
C. C. Peck Company Brochure "Welding with Machine Tool Concepts", Reprinted from *Automation*, Jun. 1975.
Bacha, F. T., "Welding of Small Diameter Deep-Drilled Holes in Copper-Nickel", *Welding Journal*, Jan. 1978.

Primary Examiner—Clifford C. Shaw
Attorney, Agent, or Firm—Fish & Richardson

[57] ABSTRACT

An apparatus for weld build-up on a surface of revolution within a bore has a head assembly, an elongated line shaft, a step assembly and a traveling assembly. The head assembly has a housing that may be fixedly mounted in a region spaced from the surface of revolution, the housing defining a chamber with an axis in alignment with an axis of revolution. It also has a spindle mounted for rotation within the chamber, coaxial with the axis of revolution. The line shaft is coupled to the spindle and extends for coaxial rotation within the bore in a region of the surface of revolution. The step assembly is fixedly mounted upon the line shaft. The traveling assembly is mounted also upon the line shaft and disposed for rotation within the bore. The traveling assembly consists of a wire reel, a wire feeder, and an electrical welding torch assembly that terminates in a torch nozzle. The step and traveling assemblies are fixed upon the line shaft for rotation within the bore, and the axial spacing between step assembly and the traveling assembly along line shaft are adjustable.

26 Claims, 31 Drawing Sheets

U.S. PATENT DOCUMENTS

| | | |
|---|---|---|
| 4,014,495 | 3/1977 | Oda et al. . |
| 4,015,086 | 3/1977 | Thatcher . |
| 4,068,791 | 1/1978 | Scholtus et al. . |
| 4,160,895 | 7/1979 | Hopper . |
| 4,161,640 | 7/1979 | Bromwich et al. . |
| 4,162,383 | 7/1979 | Hamasaki . |
| 4,199,673 | 4/1980 | Thiébaut et al. . |
| 4,215,809 | 8/1980 | Davis . |
| 4,229,641 | 10/1980 | Ihara . |
| 4,242,981 | 1/1981 | Bernard et al. . |
| 4,248,371 | 2/1981 | Melton . |
| 4,290,239 | 9/1981 | Zimmer . |
| 4,323,750 | 4/1982 | Marmorat et al. . |
| 4,328,412 | 5/1982 | Watanabe et al. . |
| 4,357,515 | 11/1982 | Kiefer et al. . |
| 4,380,697 | 4/1983 | Kazlauskas . |
| 4,392,759 | 7/1983 | Cook .................................. 403/314 |
| 4,403,136 | 9/1983 | Colman . |
| 4,404,450 | 9/1983 | Weldon . |
| 4,514,443 | 4/1985 | Kostecki . |
| 4,527,039 | 7/1985 | Füwesi . |
| 4,531,039 | 7/1985 | Okano et al. . |
| 4,538,046 | 8/1985 | Kazlauskas . |
| 4,550,235 | 10/1985 | Füwesi . |
| 4,593,445 | 6/1986 | Snyder et al. . |
| 4,647,749 | 3/1987 | Koshy . |
| 4,687,899 | 8/1987 | Acheson . |
| 4,851,639 | 7/1989 | Sugitani et al. . |
| 4,873,419 | 10/1989 | Acheson . |
| 4,906,122 | 3/1990 | Barrett et al. ........................ 403/314 |
| 4,952,769 | 8/1990 | Acheson . |

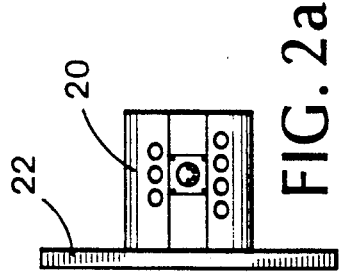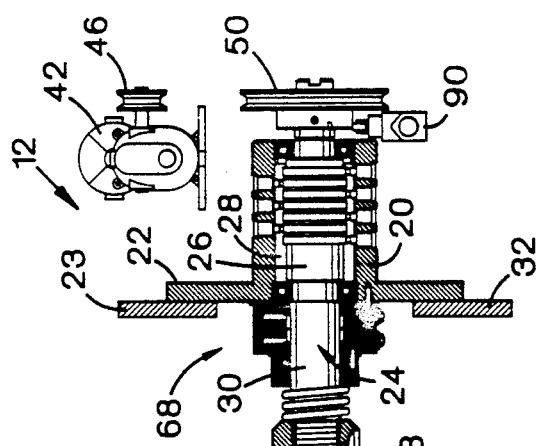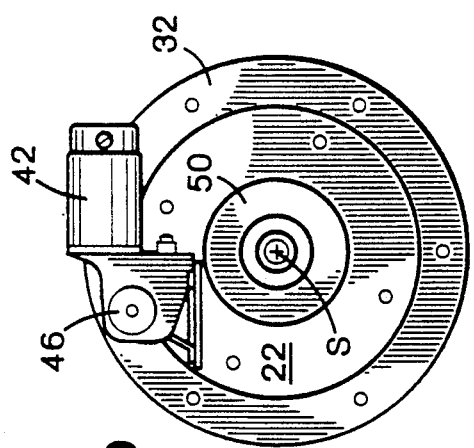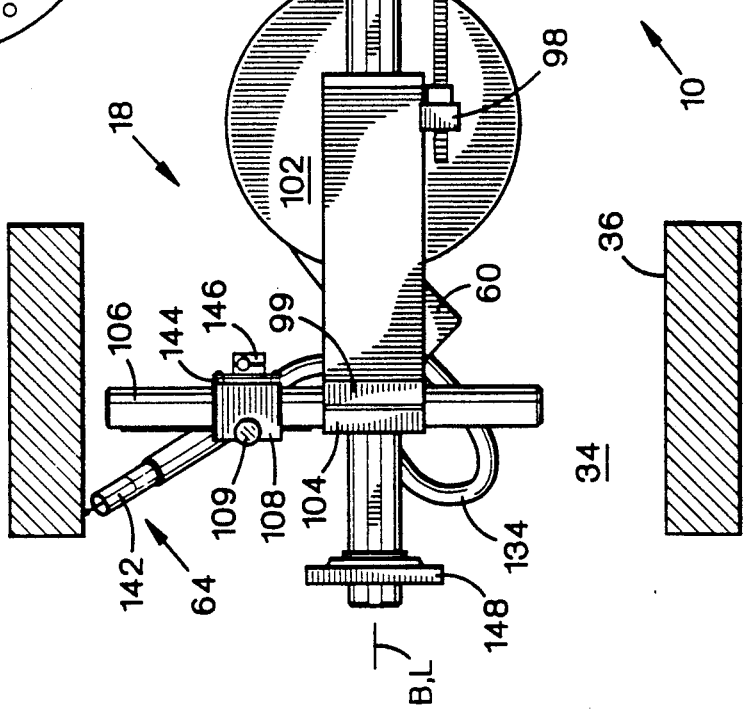

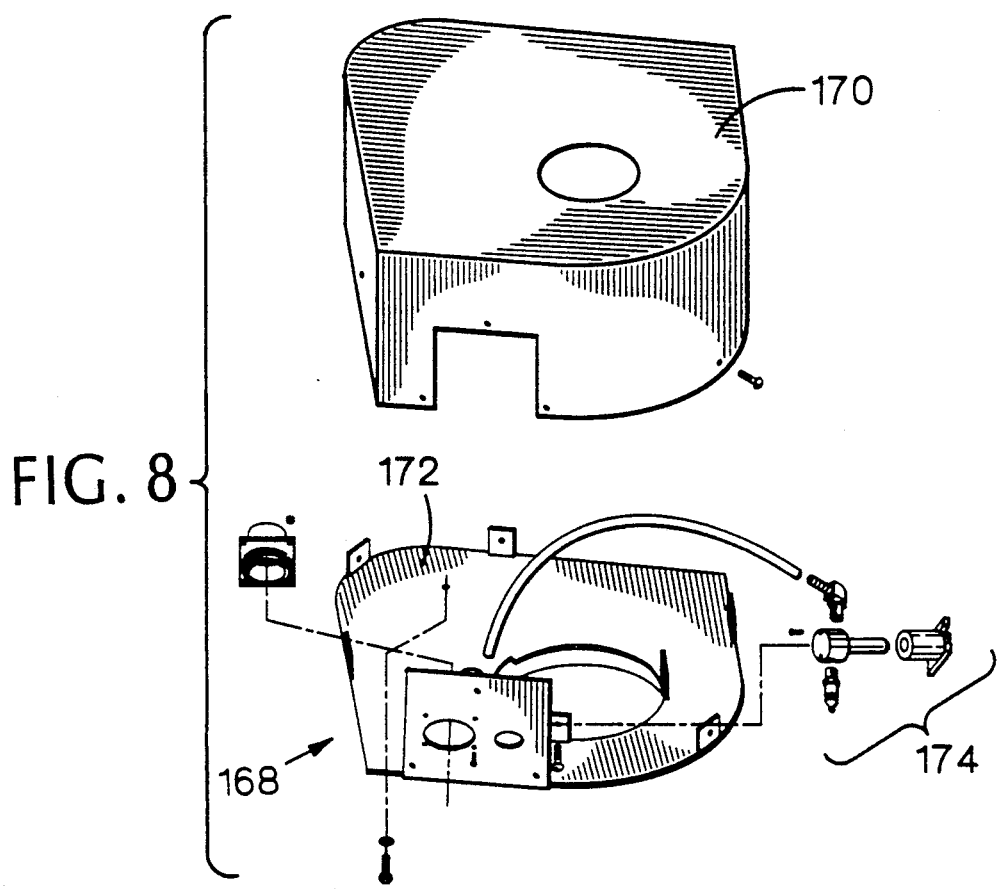
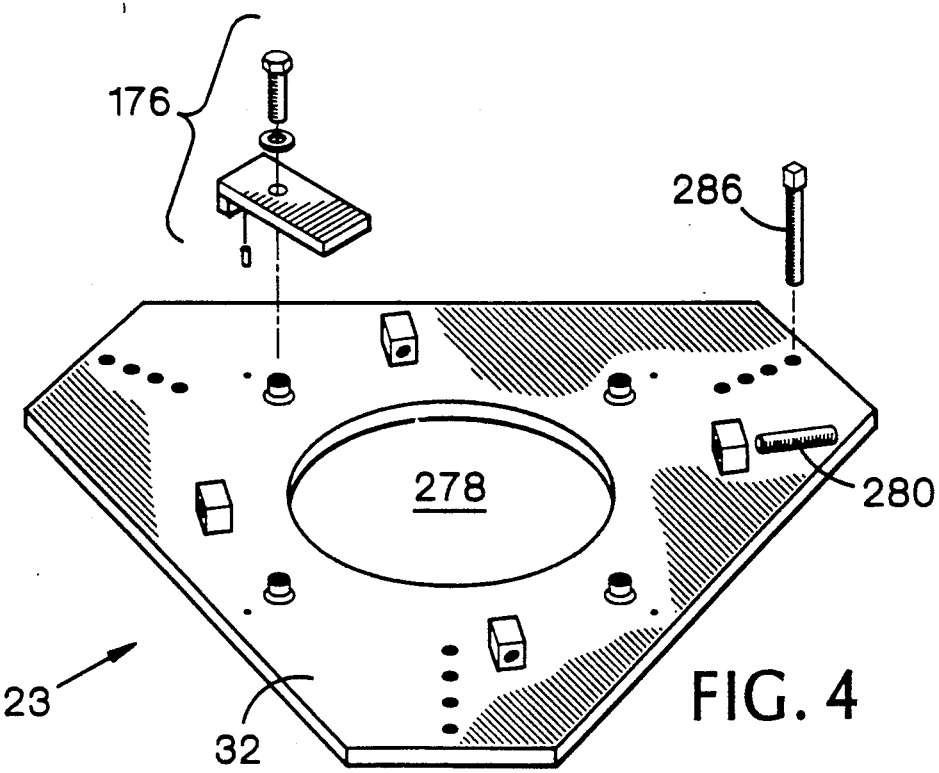

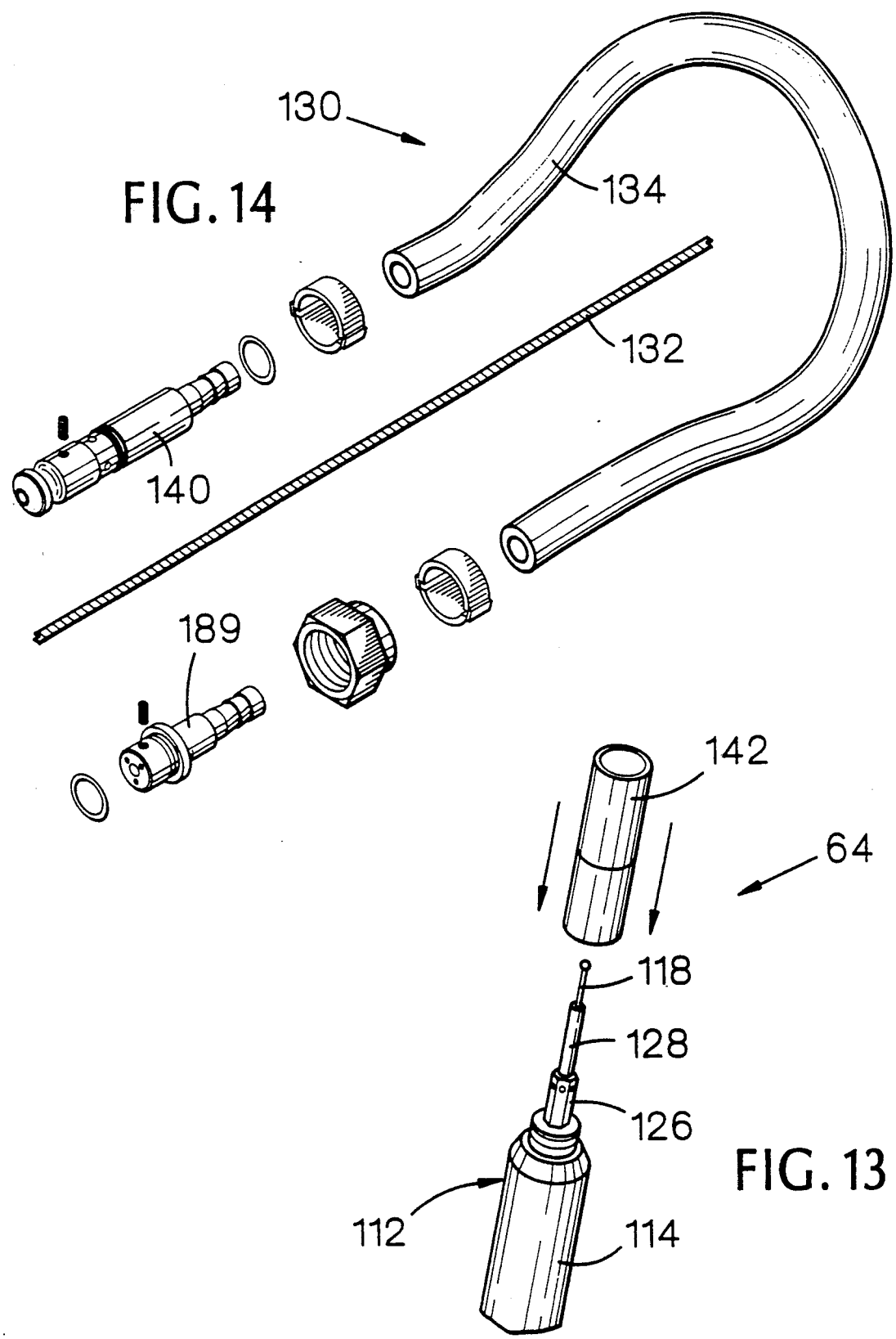

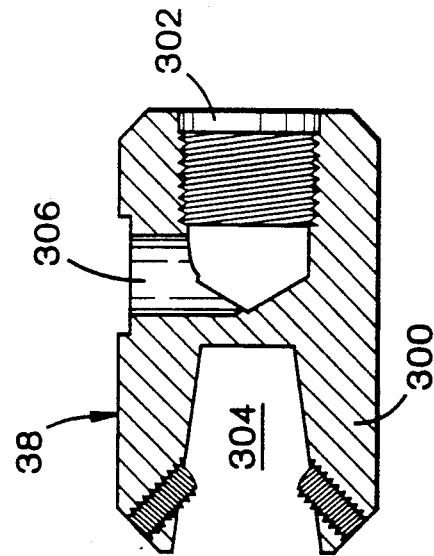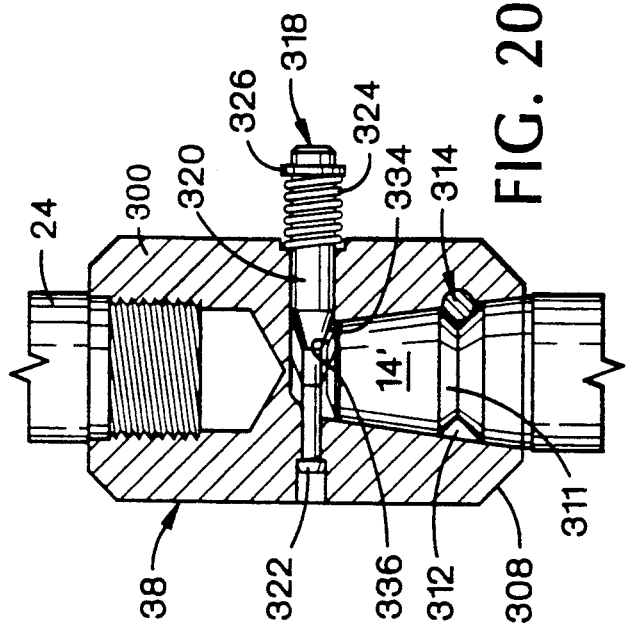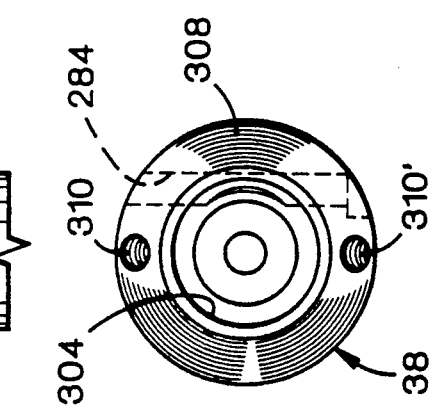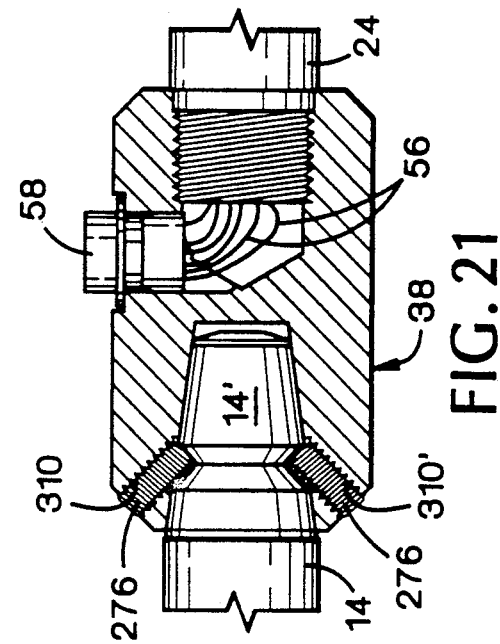

LARGE BORE WELDING APPARATUS

BACKGROUND OF THE INVENTION

The invention relates to automatic welding apparatus for weld build-up, e.g. upon the inner wall of a tank or the wall surface of a large diameter bore, and on outer cylindrical and face surfaces as well.

In the past, it has been known to employ a welding apparatus using the MIG (metallic consumable electrode using inert gas) to deposit a layer of metal upon an outer cylindrical surface, e.g. of a shaft, or the inner cylindrical surface, e.g. of a bearing, for the purpose of making repairs to a surface that has damage or is out of required dimension due to wear and the like or is machined incorrectly, or for cladding a surface with a dissimilar material, e.g. a stainless steel cladding on the inside surface of a carbon steel bore. It has also been known to build-up outer cylindrical surfaces and face surfaces. Typically, after a layer of metal is applied over an area of the surface, the surface is returned to the desired diameter by a turning process.

In one type of prior art welding apparatus used for this process, the apparatus is stationary or fixed, making it necessary to transport the article to be repaired to the site of the welding apparatus, often resulting in considerable downtime. Also, in this type of prior art apparatus, the welding torch for applying the build-up layer is fixed, and it is necessary to mount the article to be repaired for rotation of the surface past the tip of the torch.

In many instances, the article to be repaired is located at the site too remote to permit it to be transported efficiently to the welding apparatus. Also, many types of articles are too large or bulky for mounting for rotation of the surface to be repaired past the welding torch tip.

In response to these needs, others have suggested a welding apparatus that may be transported to the site of the article to be repaired, with means for moving the welding torch tip along the surface upon which a build-up layer of metal is to be applied.

Automatic welding apparatus for effecting weld build-up about either an exterior surface or a bore surface are described, e.g., in U.S. Pat. Nos. 4,323,750; 4,215,809; 4,527,039; 4,550,235 and certain automatic welding machinery sold by Cecil Peck Company, of Cleveland, Ohio.

The apparatus described in U.S. Pat. No. 4,323,750 is specifically designed as a lining machine in which the workpiece rotates. It is made typically for large diameter pipe that is to be lined with another material as in lining a cylinder with stainless steel for corrosion resistance. In this machine, the whole welding apparatus enters the pipe which is then rotated on rollers.

The apparatus described in U.S. Pat. No. 4,215,809 is specifically designed for surface build-up, but the apparatus is a lathe and rotates the workpiece while the welding head remains stationary, thus requiring that the workpiece be of limited size and configuration. For example, it would be difficult to build up the inner diameter of a cross hole in the end of a long structure with this apparatus.

U.S. Pat. Nos. 4,527,039 and 4,550,235 by Fuwesi both describe portable apparatus for applying a weld bead to build up the inner surface of a bore on an article that may be stationary, and then using the major part of the same apparatus to turn the surface to achieve the desired diameter.

Regarding the apparatus of The Cecil Peck Company, generally, such welding apparatus consists of a module, equipped with all necessary mechanical and electrical components, that is adapted to be rotated about the parts to be welded. Typically, a standard commercially available MIG welding unit designed for linear welding is used in such apparatus. For radial adjustment, the entire unit, consisting of the wire feed adjustment, the wire feed motor, gear reduction assembly and the wire feed rolls, along with the torch head, gas hose, power cables and the wire reel, must be offset and rotated, necessitating abundant clearances. This entire unit must orbit the workpiece, even when welding a small bore. The welding power source and control box are the only components of the welding system that are remotely located from the weld site.

In addition to the above, U.S. Pat. No. 3,815,807 discloses a pipe welder made for joining two cylindrical objects, with no means for automatically stepping up to form contiguous beads for building up a surface. The machine is described as effecting only a 360° weld. It is then reversed in order to disentangle power leads, gas hose and welding wire, and, therefore, it is difficult to use as a build-up machine.

Prior art welding apparatus having mechanisms for stepping-up the torch head after each circular weld has been finished typically include additional controls. These controls are provided for varying, e.g., the angular position of the torch head to the weld site or the radius of the circle that the nozzle will travel.

In a prior patent by one of the inventors here, Acheson U.S. Pat. No. 4,952,769, issued Aug. 28, 1990, the disclosure of which is incorporated herein by reference, there is described an automatic welding apparatus and method for achieving weld build-up, by which a torch is disposed for rotation within a bore for applying a uniform layer of metal for repair of the surface. According to that prior patent, the drive mechanism, the electrode wire supply feed and means for vertical adjustment of the torch tip are in fixed location outside of the bore, with the rotating torch tip extending therewithin. This arrangement permits the welding apparatus to be used for repair of relatively small diameter bores, e.g. down to 0.450 inch. The apparatus includes attachments for the torch that permit repair of bores of much greater diameter, e.g. up to 20 inches or more, with that prior art system. The weld bead is laid circumferentially, with the torch adjusted at the end of each rotation in a stepwise fashion in order to provide a more uniform layer built-up upon the surface.

Others have suggested welding apparatus for repair of relatively large diameter surface in which the welding wire and other of the mechanism are mounted for rotation with the torch. For example, McCollum U.S. Pat. No. 2,839,663 describes a welding apparatus for lining the bottom and/or sidewall of molten metal ladles, with the bead deposited in a spiral pattern. The wire feed is mounted on the rotating platform. A vertical rack-and-pinion arrangement is positioned to raise and lower the welding head relative to the platform. Smith U.S. Pat. No. 3,627,973 also describes a device for applying weld beads within a tank, with the welder reversed after each circumferential pass, the welding wire being fed from a fixed, external source.

SUMMARY OF THE INVENTION

According to the invention, an apparatus for weld build-up on a surface of revolution within a bore comprises a head assembly comprising a housing defining a chamber (which may be open) having an axis, the housing adapted for fixed mounting in a region spaced from the surface of revolution, with the axis of the chamber in alignment with an axis of revolution, and a spindle mounted for rotation within the chamber, coaxial with the axis of revolution, an elongated line shaft coupled to the spindle and extending for coaxial rotation within the bore in a region of the surface of revolution, a step assembly fixedly mounted upon the line shaft, and a traveling assembly mounted upon the line shaft and disposed for rotation within the bore, the traveling assembly comprising a wire reel, a wire feeder, and an electrical welding torch assembly that terminates in a torch nozzle, the step assembly and the traveling assembly fixed upon the line shaft for rotation within the bore, and the welding apparatus further comprising means for adjustment of the axial spacing between the step assembly and the traveling assembly along the line shaft.

Preferred embodiments of the invention may include one or more of the following features. The means for adjustment of the axial spacing between the step assembly and the traveling assembly along the line shaft comprises a threaded rod fixed axially relative to the step assembly, and a threaded nut fixedly mounted to the traveling assembly, the rod disposed in threaded engagement with the nut. Preferably, the step assembly further comprises a step motor for rotation of the threaded rod in a manner to adjust the axial position of the traveling assembly relative to the step assembly, along the line shaft. The welding apparatus further comprises means for introducing welding current from an external source to the torch assembly. Preferably the means for introducing welding current comprises a power connector assembly disposed about the spindle, the power connector assembly comprising a first, electrically conductive, non-rotatable power connector element joined to the housing and defining a first electrically conductive surface, and a second, electrically conductive, rotatable power connector element joined to the spindle and defining a second electrically conductive surface opposed to and in electrically-conductive engagement with the first surface at an electrically conductive interface, means for connecting the first, non-rotatable power connector element to a fixed, external source of electrical welding current, the current passing from the first power connector element to the second power connector element by way of the interface, and means for delivering welding current from the second, rotatable power connector element to the torch assembly. The head assembly may further comprise means for electrically insulating the housing from the power connector assembly. The welding apparatus further comprises means for introducing inert gas from an external source to the torch assembly. Preferably, the means for introducing inert gas comprises a first, non-rotatable power connector element joined to the housing, and a second, rotatable power connector element joined to the spindle, the first power connector element defining an inlet port for connection to an external supply of gas, the second power connector element defining an outlet port for supply of the gas to the torch assembly, and the first power connector element and the second power connector element together defining a cavity connecting the inlet port to the outlet port. Preferably, the head assembly further comprises means for urging together the first power connector element and the second power connector element in a manner to secure the interface against leakage of the inert gas, e.g., the means for urging may comprise a compression spring disposed about the spindle. The head assembly further comprises means for passing at least one electrical circuit into the rotating spindle, the means for passing comprising a slip ring mounted upon the spindle and a brush mounted upon the fixed housing. The head assembly further comprises a motor for driving the spindle. The line shaft defines a keyway and the traveling assembly and the step assembly each defines a key engaged in the keyway in a manner to cause both the traveling assembly and the step assembly to rotate with the line shaft within the bore. The torch assembly comprises a rod mounted in a clamp and extending generally radially of the axis of the line shaft, the welding torch nozzle mounted upon the rod and adapted for positioning adjacent a surface to be repaired. Preferably, the clamp, in a first position, permits movement of the rod radially for coarse adjustment of the position of the torch nozzle relative to the surface to be repaired, and in a second position fixes the coarse adjustment position of the torch nozzle. The rod may further define a multi-tooth rack, and the torch assembly further comprise a block disposed for movement axially along the rod, and a pinion gear mounted within the block in engagement with the rack and connected to an external knob, whereby the welding torch nozzle, mounted upon the block, is movable along the rod by rotation of the knob to fine adjust the position of the welding torch nozzle relative to the surface to be repaired. The step assembly may further comprise a step clamp for releasably securing the axial position of the step assembly along the line shaft and the traveling assembly further comprises a traveling clamp for releasably securing the axial position of the traveling assembly along the line shaft, whereby, during weld build-up, the step clamp is engaged and the traveling clamp is disengaged and rotation of the threaded rod causes movement of the traveling assembly along the line shaft, and, during set-up, the step clamp is disengaged and the traveling clamp is engaged and rotation of the threaded rod causes movement of the step assembly along the line shaft.

According to another embodiment of the invention, a coupling for axially joining a first shaft and a second shaft coupling comprises a coupling body, the coupling body defining a first axial bore sized and adapted for receiving an end of the first shaft, and a second axial bore sized and adapted for receiving an end of the second shaft, at least the second axial bore being tapered, and the coupling body defining a cross hole bore intersecting a base region of the tapered second axial bore, a knockout pin disposed within the cross hole bore for movement between a first (extended) position and a second (inserted) position, and a spring, the knockout pin defining a radial flange and the spring disposed about the knockout pin, between the flange and an opposed surface of the coupling body, the spring adapted to urge the knockout pin toward the first position, the knockout pin further defining a shoulder surface disposed for engagement with an opposed surface of the coupling body for limiting movement of the knockout pin toward the first position, and the knockout pin further defining a ramping surface adapted to engage a surface of the shaft disposed within the second axial bore when the knockout pin is moved from the first position toward the second position, in a manner to urge the second shaft and the coupling to separate.

Preferred embodiments of the invention may include one or more of the following features. The cross hole bore has a first hole portion of a first diameter and a second hole portion of a second, relatively smaller diameter, and the knockout pin comprises a first pin portion disposed generally in the first hole portion, a second pin portion disposed generally in the second hole portion, the first pin portion defining the radial flange, the second pin portion defining the shoulder surface disposed for engagement with the opposed surface of the coupling body, and the first pin portion further defining the ramping surface adapted to engage a surface of the shaft disposed within the second axial bore when the knockout pin is moved from the first position toward the second position, in a manner to urge the second shaft and the coupling to separate. The surface the second shaft disposed within the second axial bore defines a circumferential groove, the coupling defines a second cross hole intersecting a region of the groove and tangent to the surface of the shaft, and the coupling further comprises a safety pin adapted to be placed within the second cross hole to interfere with separation of the second shaft and the coupling. The coupling body further defines one or more transverse threaded bores intersecting the second axial bore in the region of the groove, the one or more transverse threaded bores disposed at an acute angle to the axis of the coupling, the coupling further comprising one or more set screws disposed in the bores, in engagement with a surface of the groove, in manner to resist separation of the shaft and the coupling. The ramping surface is removed from the second axial bore when the knockout pin in is the first position. The first axial bore is threaded, the first shaft is a hollow spindle defining a conduit for one or more electrical wires, and the coupling body defines a transverse conduit intersecting the first axial bore and providing a conduit for the electrical wires from within the spindle.

According to another aspect of the invention, a method of weld buildup upon a substantially flat surface of a workpiece comprising the steps of: (a) holding the workpiece fixed against movement; (b) rotating an orbital welding torch in a circular path about the surface in an amount equal to about 360° around the surface to a limit point while at the same time continuously feeding weld wire from a source of wire and electrical power to the torch to form a substantially circular weld bead upon the surface; (c) immediately stepping the torch in a radial direction upon the torch reaching the limit point for a distance equal substantially to the width of the circular weld bead while at the same time continuing to rotate the torch and continuing to feed the wire and electrical power to the torch; (d) rotating an orbital welding torch in a circular path in an amount slightly less than 360° around the surface to a limit point while continuously feeding weld wire and electrical power to the torch to form a substantially circular weld bead upon the surface; (e) repeating step (c); (f) repeating step (d) and (c) as desired; and (g) lastly, repeating step (b).

According to another aspect of the invention, a method of weld buildup upon a concave surface of a workpiece comprising the steps of: (a) holding the workpiece fixed against movement; (b) rotating an orbital welding torch in a circular path about the surface in an amount equal to about 360° around the surface to a limit point while at the same time continuously feeding weld wire from a source of wire and electrical power to the torch to form a substantially circular weld bead upon the surface; (c) immediately stepping the torch in a direction having both radial and axial components upon the torch reaching the limit point for a distance equal substantially to the width of the circular weld bead upon the surface while at the same time continuing to rotate the torch and continuing to feed the wire and electrical power to the torch; (d) rotating an orbital welding torch in a circular path in an amount slightly less than 360° around the surface to a limit point while continuously feeding weld wire and electrical power to the torch to form a substantially circular weld bead upon the surface; (e) repeating step (c); (f) repeating step (d) and (c) as desired; and (g) lastly, repeating step (b).

Objectives of the invention include providing a welding apparatus that is sufficiently portable to permit easy transport to and assembly at the site of a bore or similar surface to be repaired. The apparatus will be adapted for mounting within the bore, or, where the bore is of relatively small diameter, it will be adapted for mounting with only the torch itself within the bore. As a further objective, it will be possible to apply a weld bead in a manner to form a full, circumferential layer upon the surface of the bore, and also to interrupt the bead in order to form one or more keyways, e.g. for lubrication slots, and to apply the bead over only a limited arc, perhaps in a back-and-forth motion, to form a patch build-up. The speed of torch rotation may be alternated, e.g. with the torch rotated at a significantly higher speed when no bead is being applied, for improved efficiency.

Other features and advantages of the invention will be seen from the following description of a presently preferred embodiment, and from the claims.

BRIEF DESCRIPTION OF THE DRAWINGS

FIG. 2 is a somewhat diagrammatic plan view, partially in section, of the welding apparatus of FIG. 1;

FIG. 2A is a side view of the head assembly and upper section;

FIG. 2B is a top view, of the welding apparatus of FIG. 1, both shown with the shroud removed;

FIG. 4 is an exploded perspective view of the mounting plate of the welding apparatus of FIG. 1;

FIG. 8 is an exploded perspective view of the shroud assembly mounting plate of the welding apparatus of FIG. 1;

FIG. 13 is a perspective view of a torch assembly for use with a welding apparatus of the invention; and FIG. 14 is an exploded perspective view of the wire feed conduit of the welding apparatus of FIG. 1.

FIG. 16 is an end view;

FIGS. 20, 21 and 22 are top, left side and right side views, partially in section, of the bar coupling of FIG. 15.

DETAILED DESCRIPTION OF PRESENTLY PREFERRED EMBODIMENT

Figure 1:
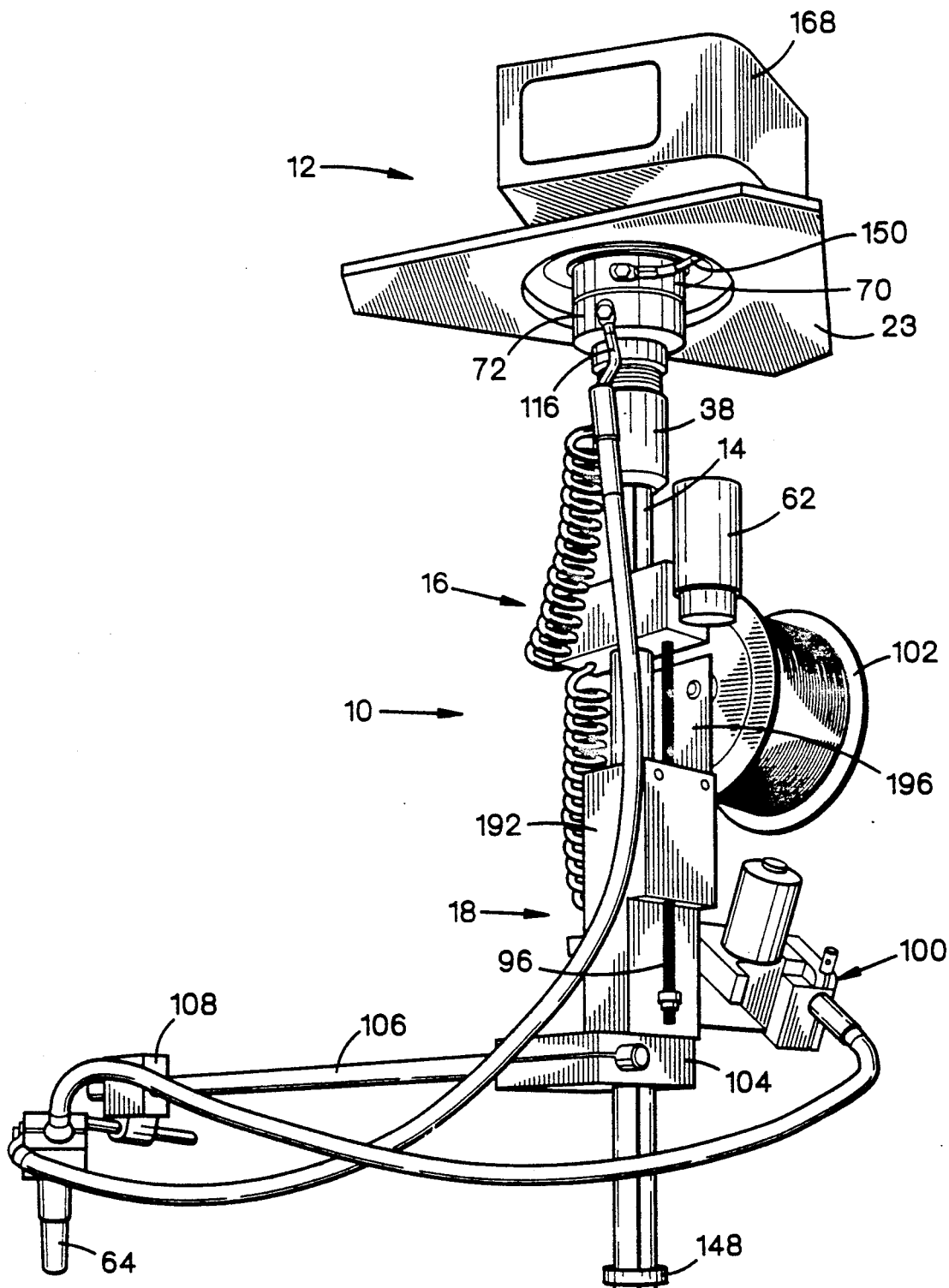
FIG. 1 is a perspective view of a welding apparatus of the invention.
Figure 3:
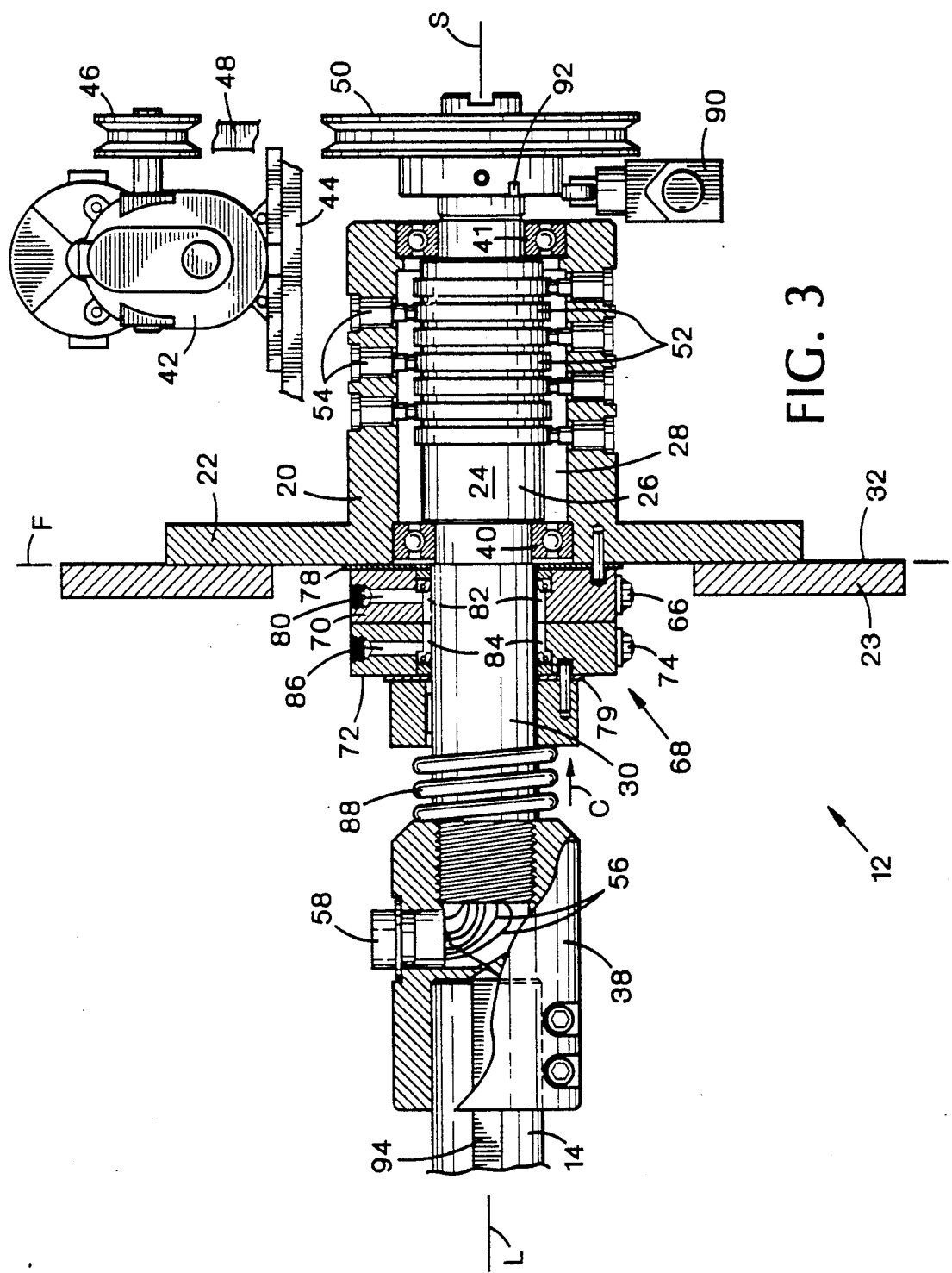
FIG. 3 is an enlarged plan view, also partially in section, of the head assembly and upper section of the welding apparatus of FIG. 1.
Figure 5:
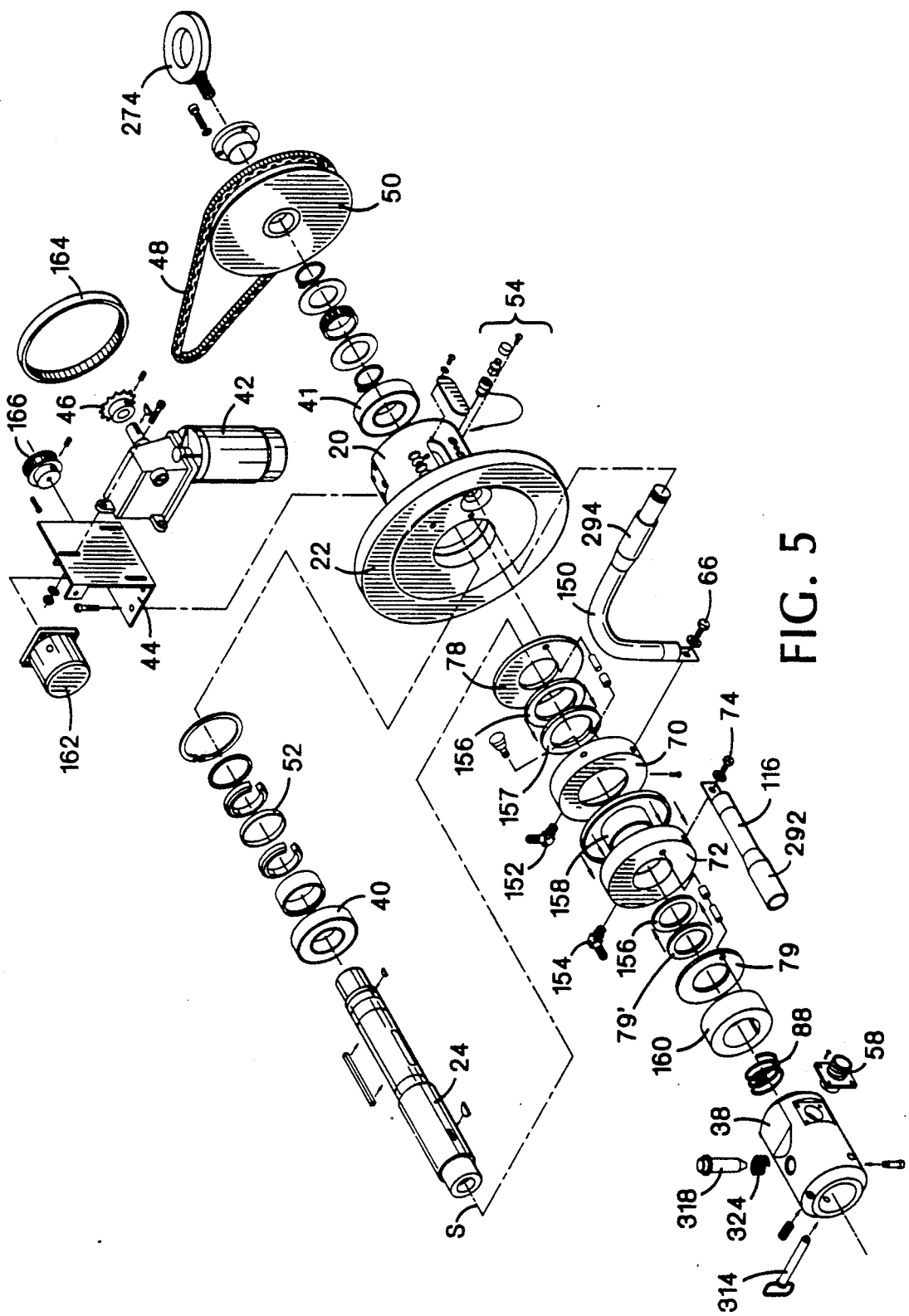
FIG. 5 is a similar exploded perspective view of the head assembly of the welding apparatus of FIG. 1.
Figure 6:
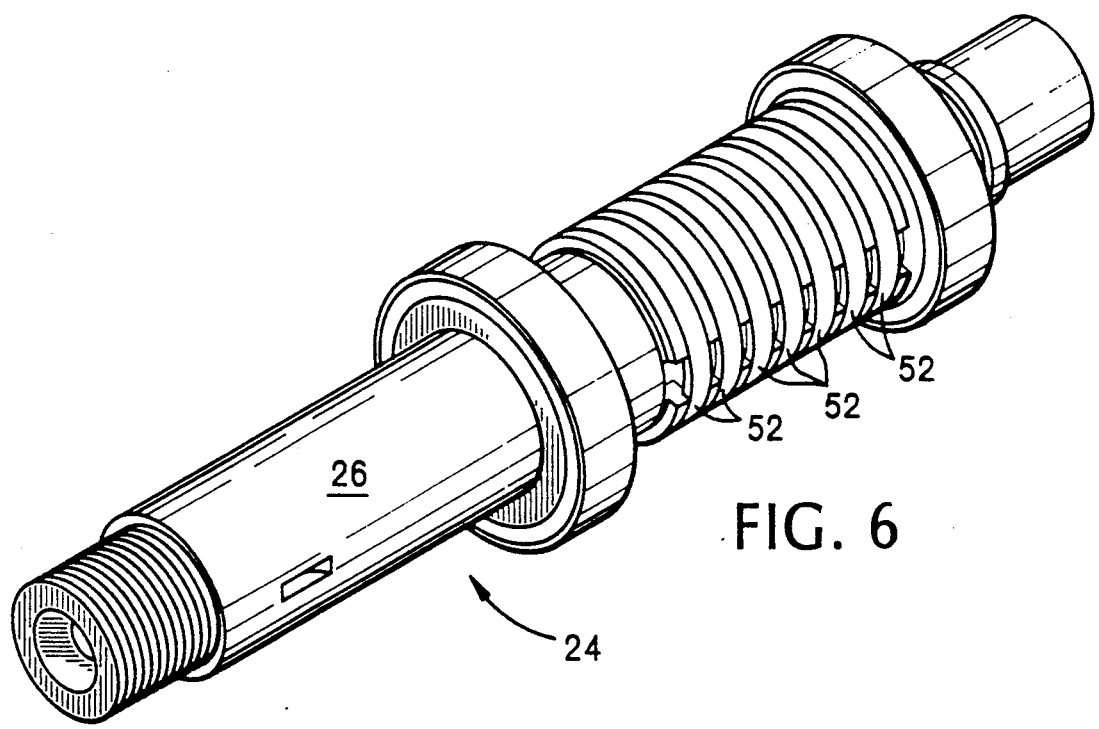
FIG. 6 is a perspective view of the upper (slip ring) portion of the spindle of the welding apparatus of FIG. 1.

Referring now to FIGS. 1 and 2, a welding apparatus 10 of the invention includes a head assembly 12, a line shaft 14, a step assembly 16 and a traveling assembly 18.

Referring now also to FIGS. 3 through 8, the head assembly 12 includes a housing 20 having a radial flange 22. The head assembly further includes a spindle 24 having a head portion 26 that is mounted for rotation within an axial chamber 28 defined by the housing, the head portion of the spindle 24 being supported for rotation within the chamber by bearings 40, 41. The spindle 24 further has a tail portion 30 which extends through the flange 22, with the axis S of the spindle 24 extending perpendicular to the mounting plane F of the flange 22.

The radial flange 22 of the housing 20 is provided for fixed mounting of the welding apparatus, e.g. by clamping or bolting using mounting plate hold-down assemblies 176, upon a surface 32 of a mounting plate 23 (FIG. 4), the mounting plate being disposed external of the bore 34 defined by an internal surface 36 to be repaired (or the mounting plate may be disposed within the bore 34, but spaced from the internal surface 36), the surface 32 being supported, e.g., by a part of the article being welded, the floor, or some other solid object. The flange is mounted in a manner to align the plane F of the flange perpendicular also to the axis B of the surface to be repaired, as described more fully below.

The line shaft 14 is attached to the tail portion 30 of the spindle 24 by means of a head coupling 38 (described more fully below), with the axis L of the line shaft 14 and the axis S of the spindle being coaxial, and perpendicular to the plane F.

The head assembly 12 thus provides all or at least a significant portion of the support for the line shaft 14, and for the step assembly 16 and the traveling assembly 18 mounted thereon, as will be described below.

A rotation motor 42 mounted on the frame 44 of head assembly 12 supplies rotational energy to the line shaft 14. This energy passes through the rotation motor drive sprocket 46, drive chain 48, spindle drive sprocket 50, spindle 24 and head coupling 38, to the line shaft 14.

Several circuits of electrical energy are passed to the rotating head portion 26 of the spindle 24 by the use of one or more slip rings 52 (FIG. 6) attached to the rotating head portion, and brush assemblies 54 positioned radially in the head assembly housing 20 (FIG. 2A). Wires 56 attached to the slip rings 52 pass through the hollow center of the spindle 24 and then to the connector 58 located in the head coupling 38. The electrical energy passing through these wires is delivered via connector 190 to coil cord 191 (FIG. 10) to upper and lower junction boxes 208, 210, for driving the wire feed motor 60 and the step motor 62, respectively.

Figure 7:
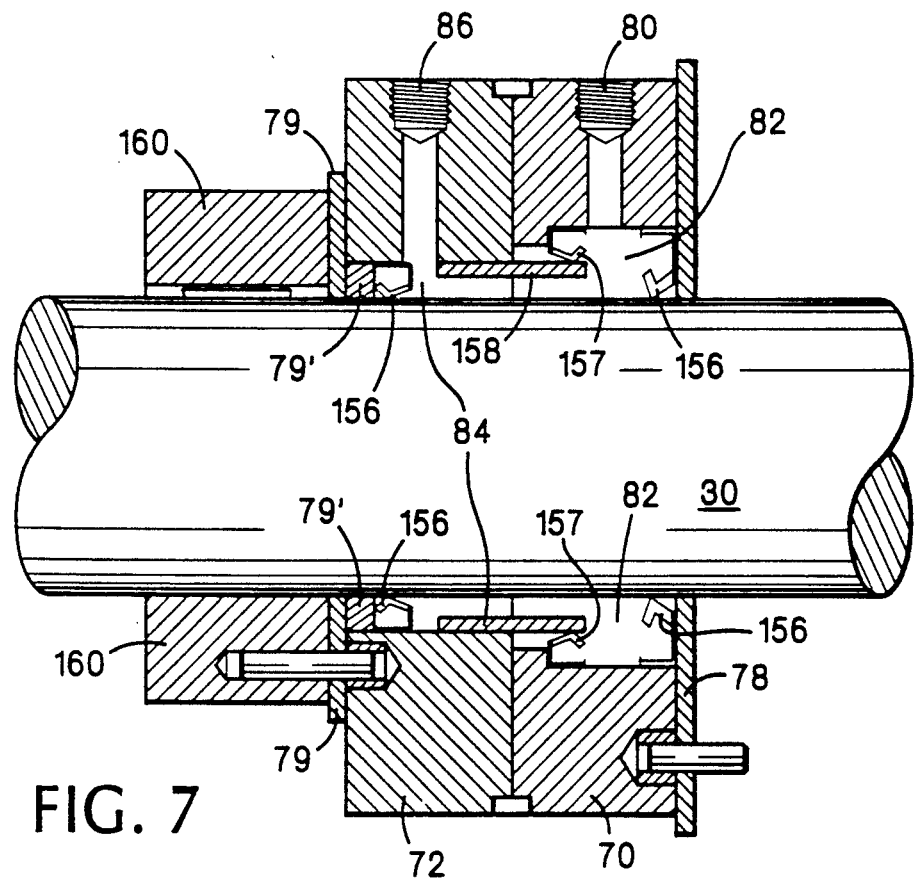
FIG. 7 is a side sectional view of the rotatable power connector segment of the welding apparatus of FIG. 1.
Figure 12:
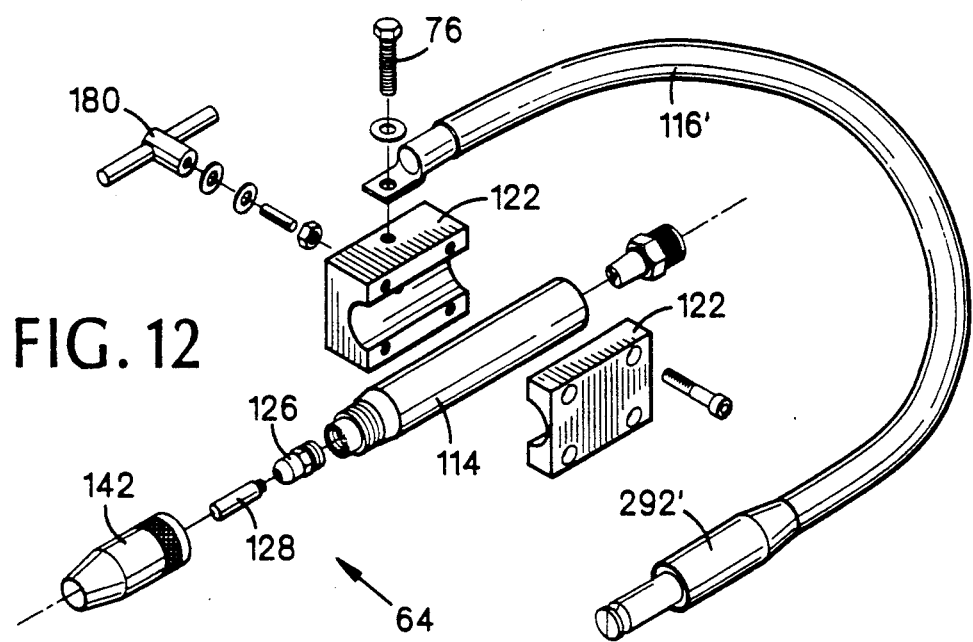
FIG. 12 is an exploded perspective view of the torch assembly of the welding apparatus of FIG. 1.
Figure 11:
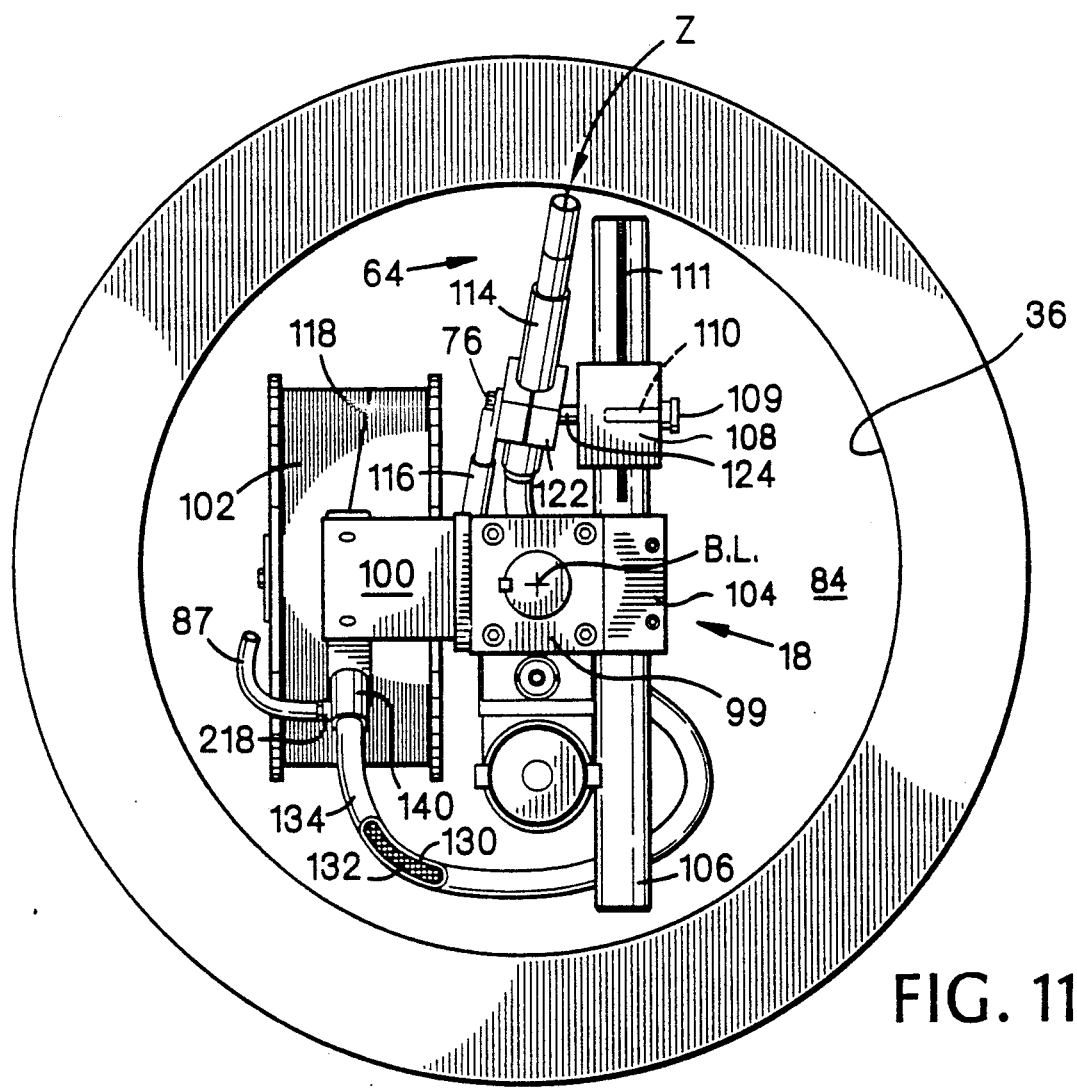
FIG. 11 is a bottom view of the welding apparatus of FIG. 1.
Figure 15:
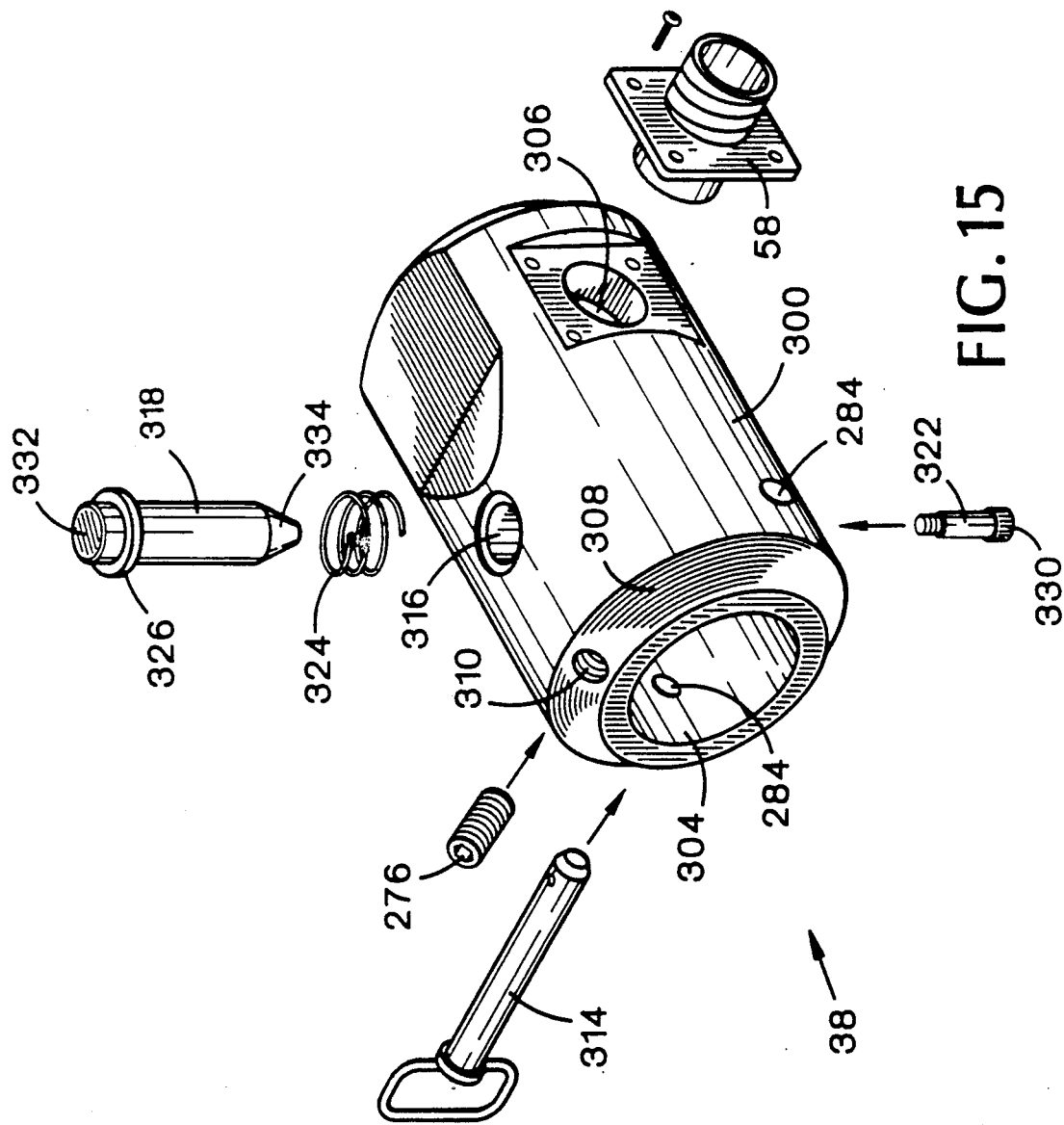
FIG. 15 is an exploded perspective view of a bar coupling of the invention similar to that of FIG. 5 but on a larger scale.
Figure 17:
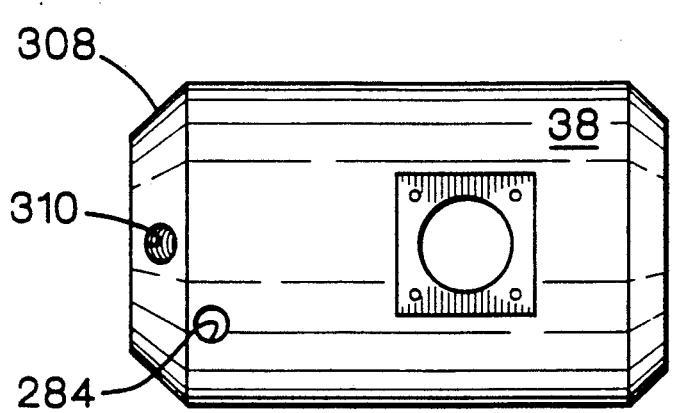
FIGS. 17, 18 and 19 are top, side and bottom views, respectively, of the bar coupling of FIG. 15.
Figure 18:
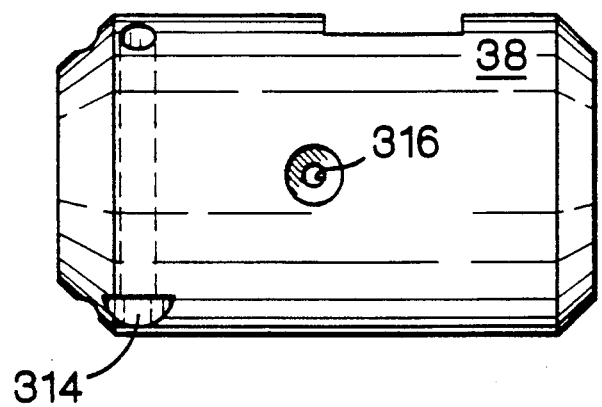
Figure 19:
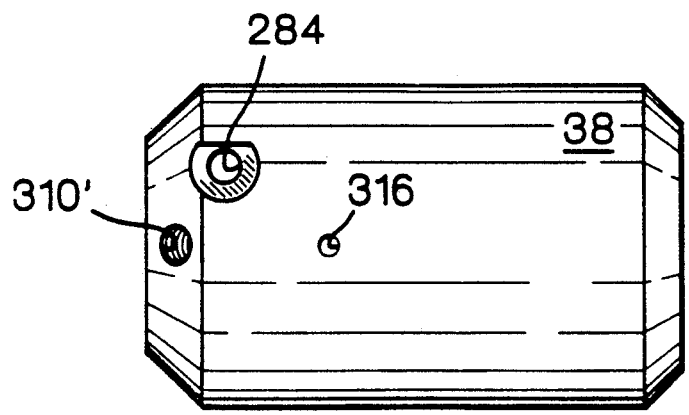
Figure 23A:
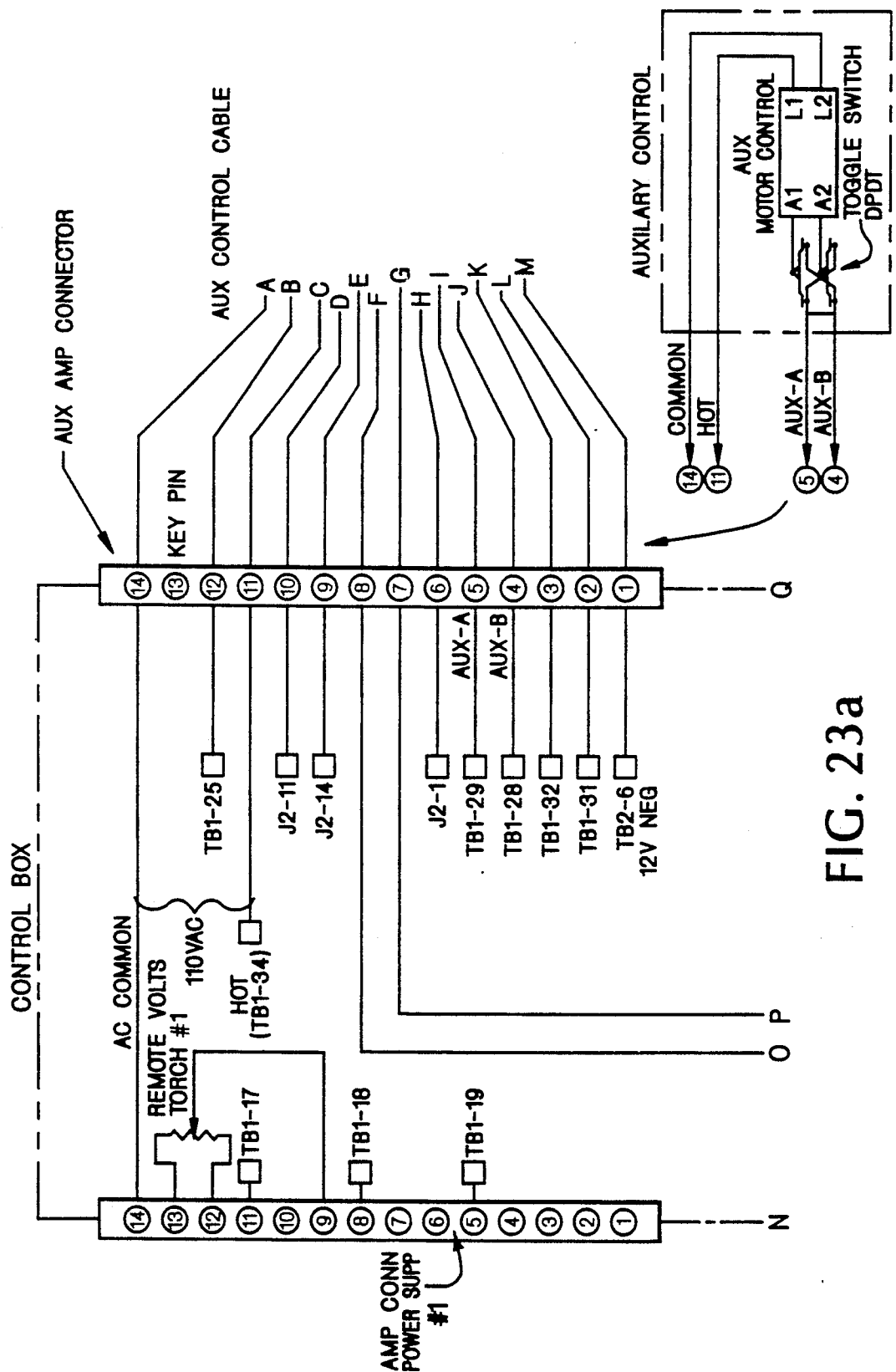
FIGS. 23a-23d are a schematic diagram of the circuitry of the welding apparatus of the invention.
Figure 23B:
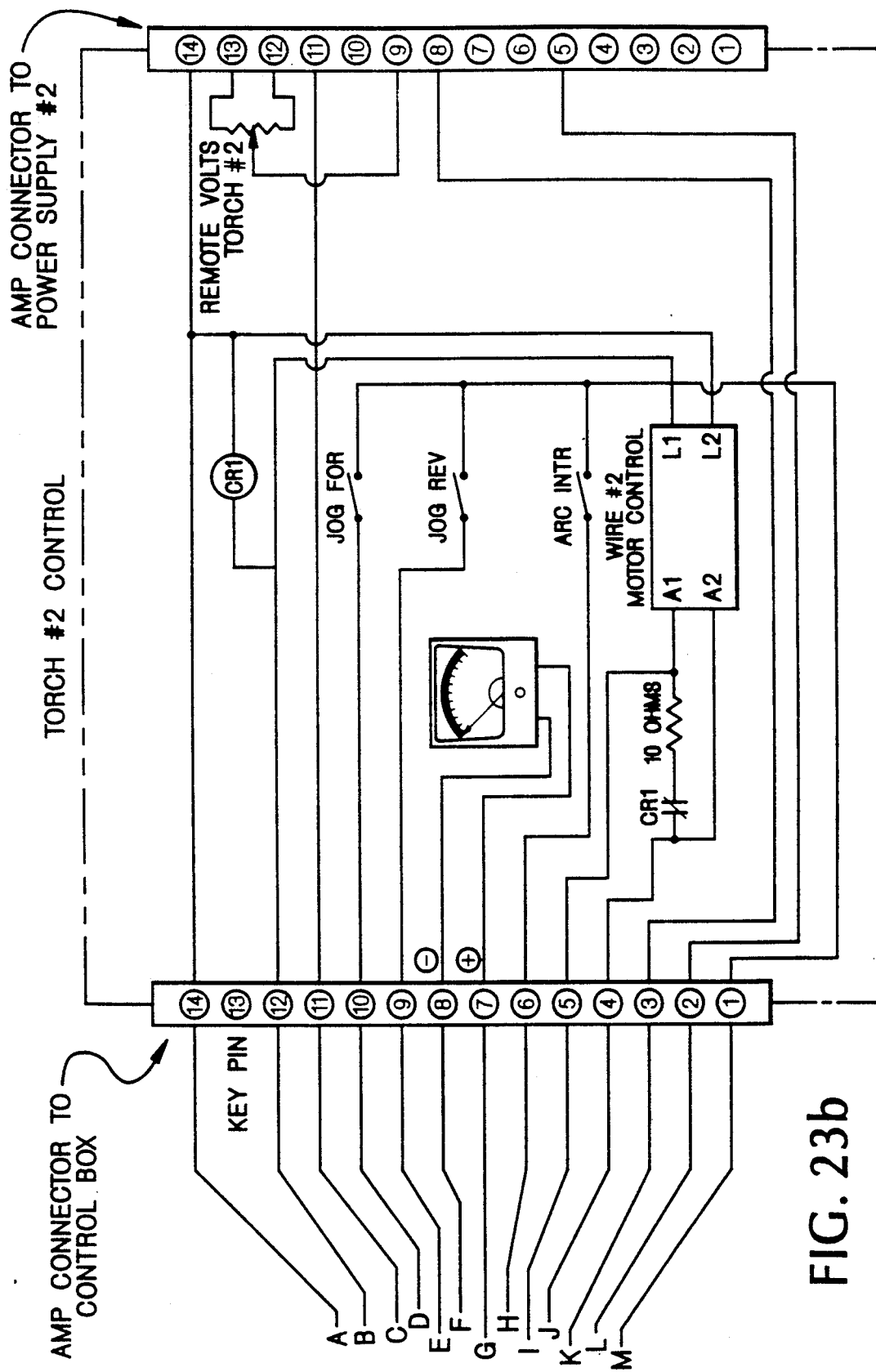
Figure 23C:
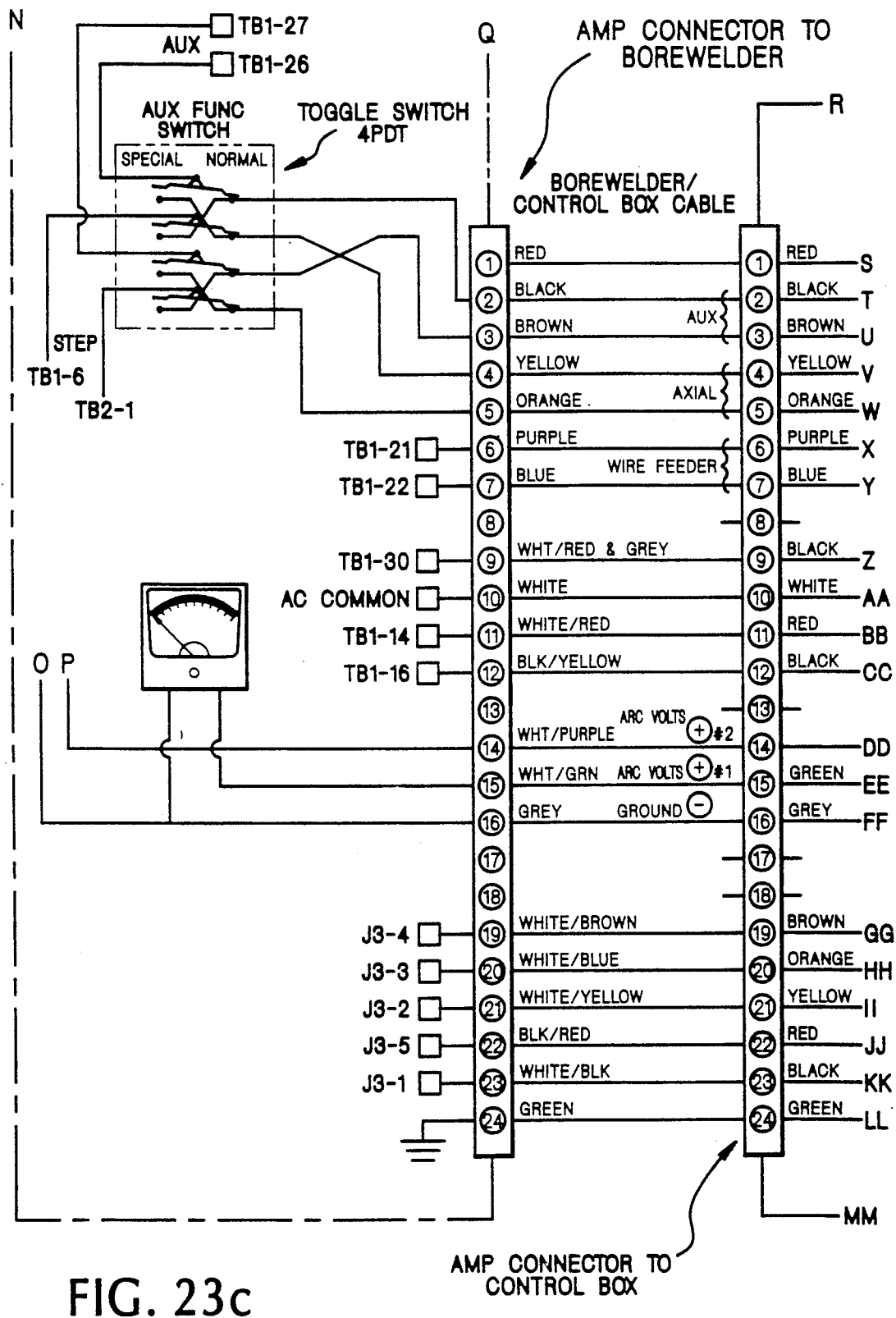
Figure 23D:
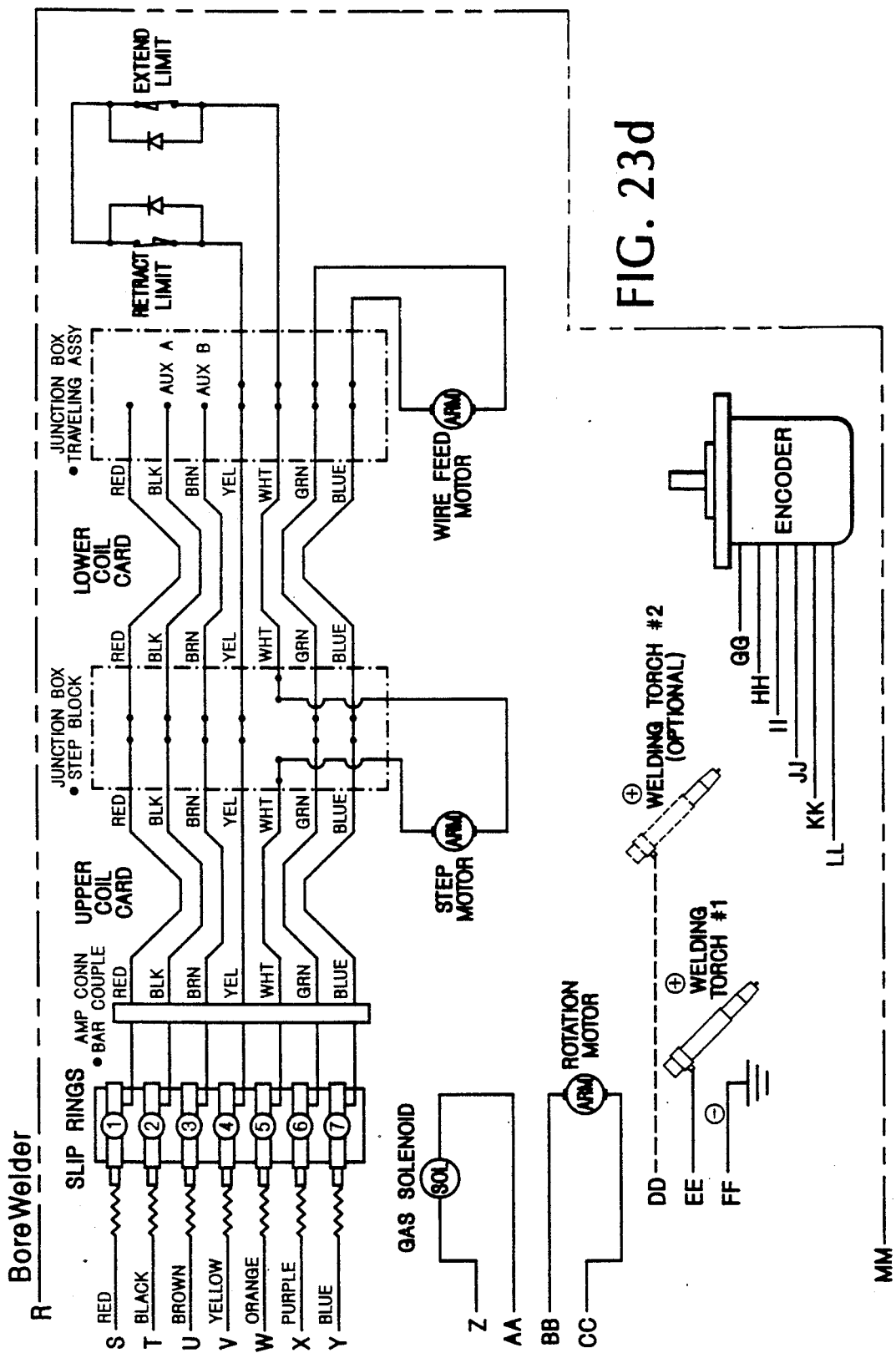
Figure 24:
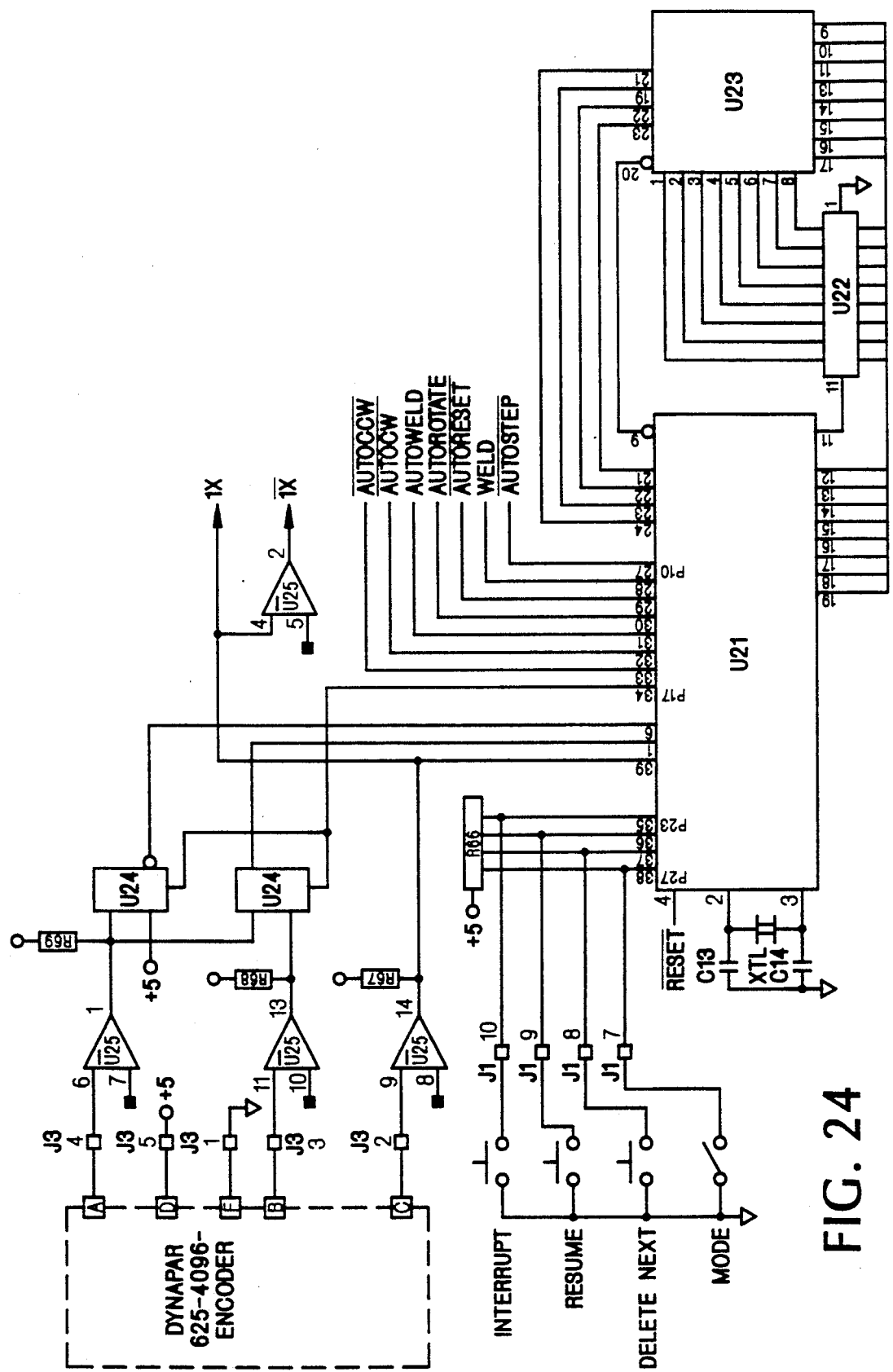
FIG. 24 is an electrical schematic diagram for the processor section of the welding apparatus of the invention.
Figure 25A:
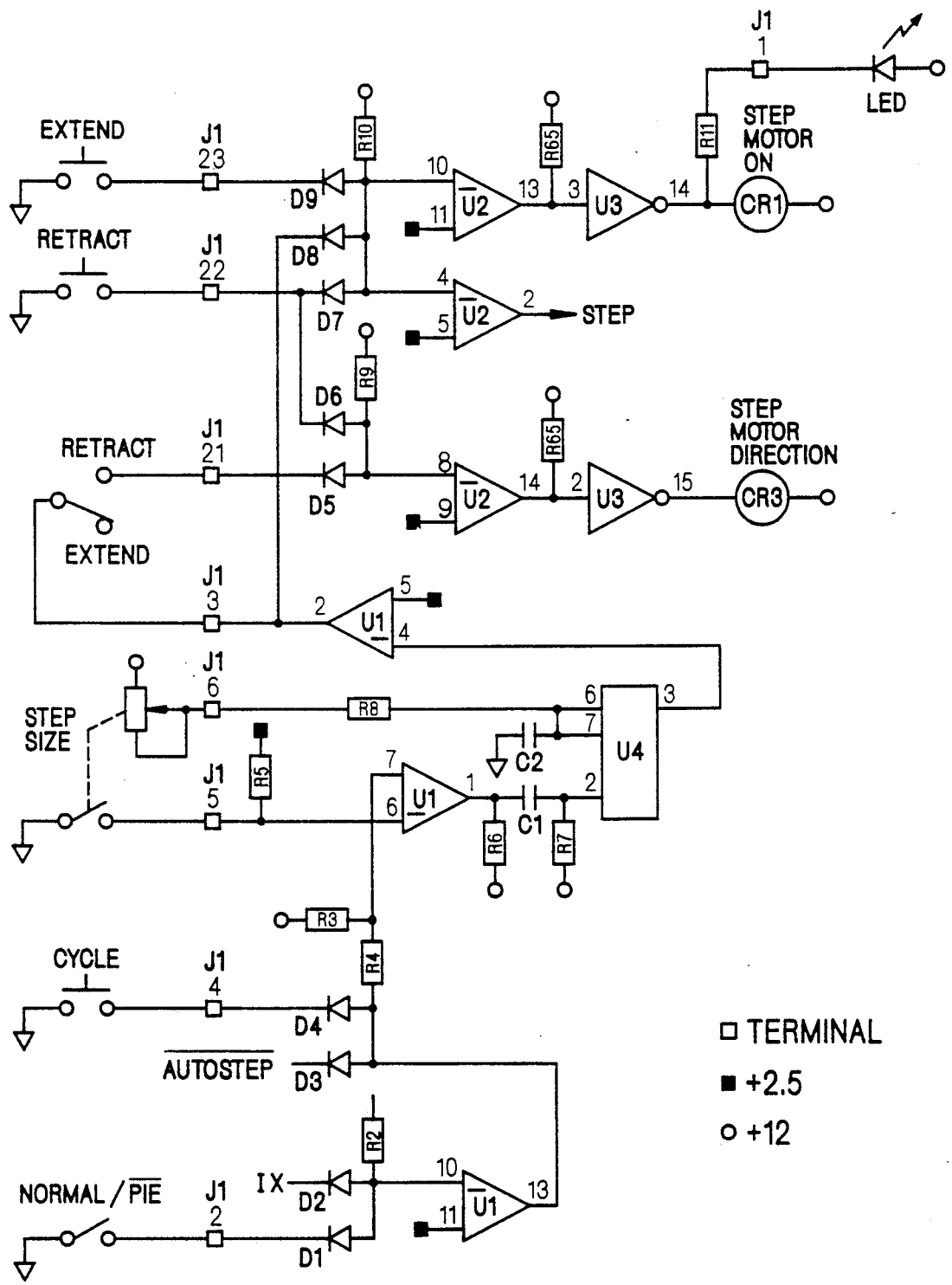
FIGS. 25a-25d are electrical schematic diagrams for the step and rotate functions of the welding apparatus of the invention.
Figure 25B:
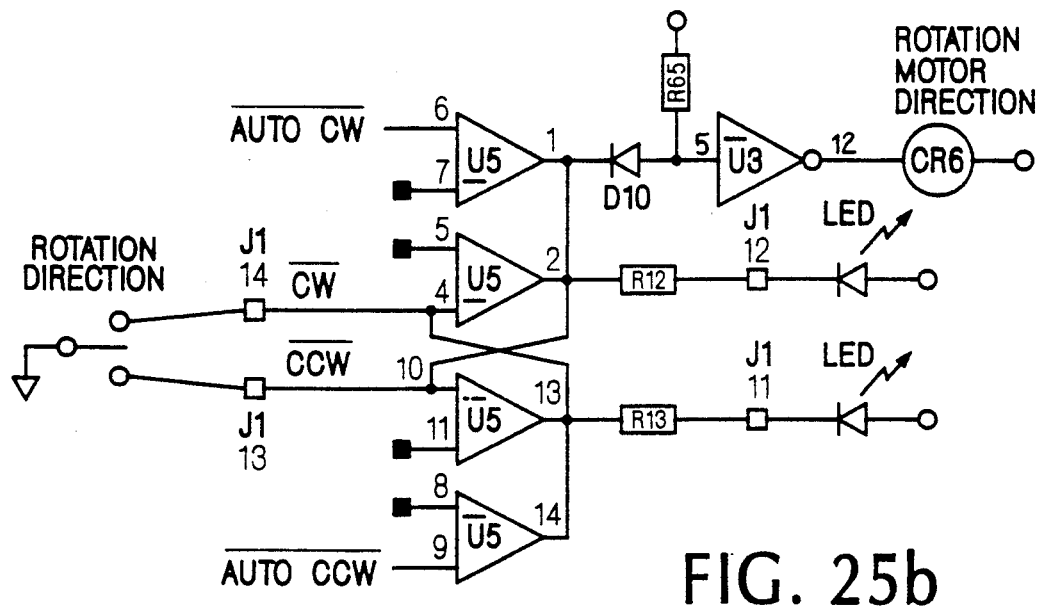
Figure 25C:
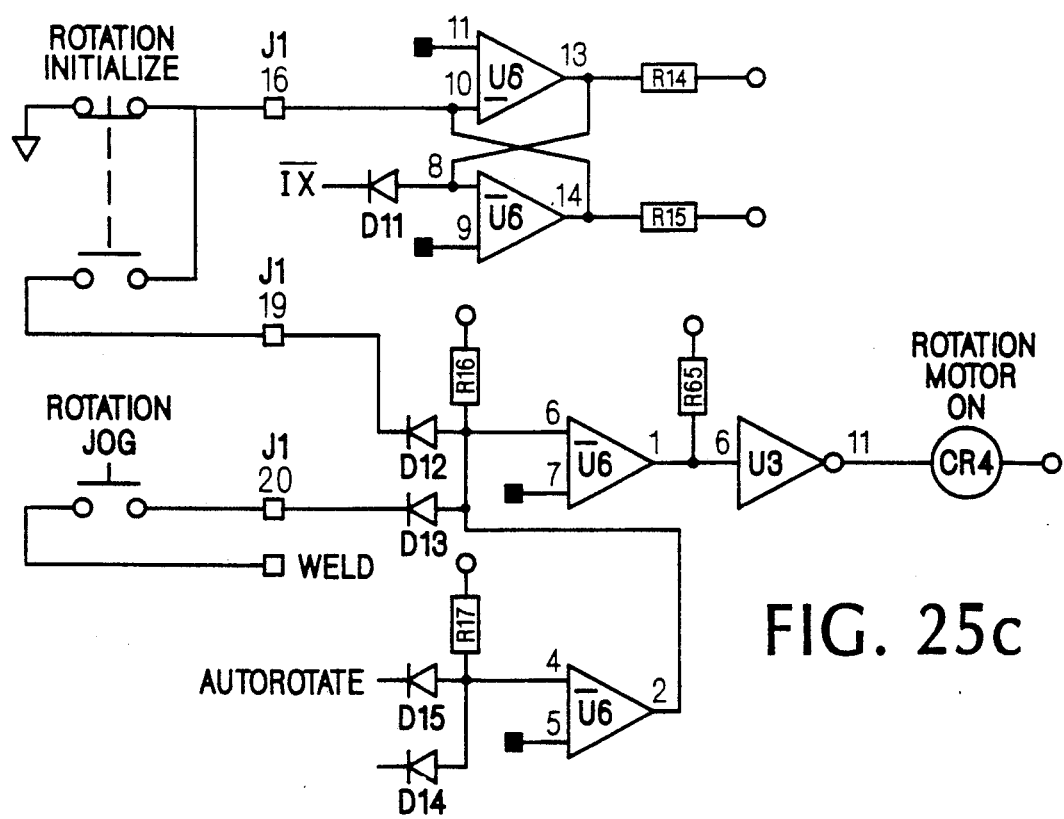
Figure 25D:
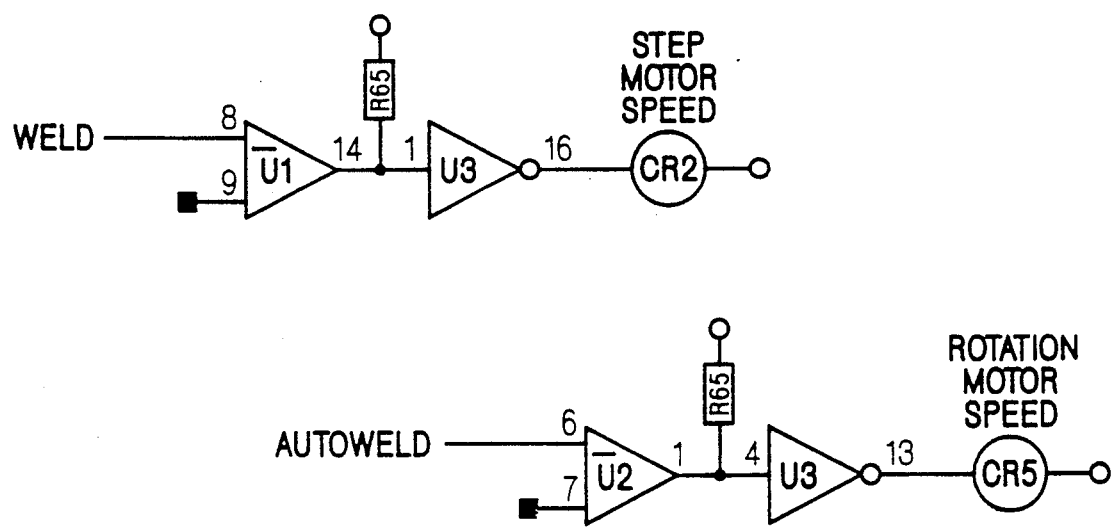
Figure 26A:
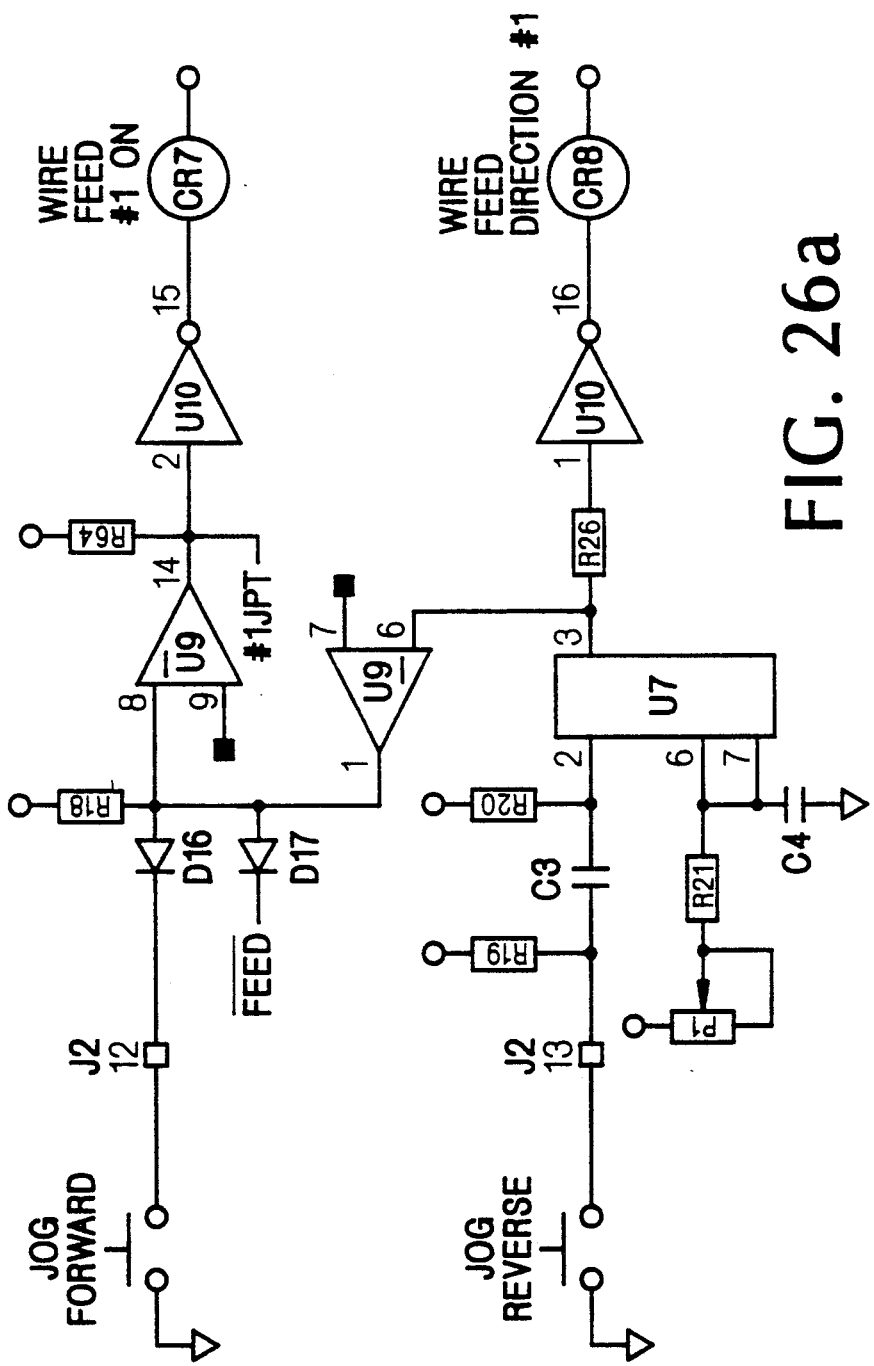
FIGS. 26a-26d are electrical schematic diagrams for the feed, weld and gas control functions of the welding apparatus of the invention.
Figure 26B:
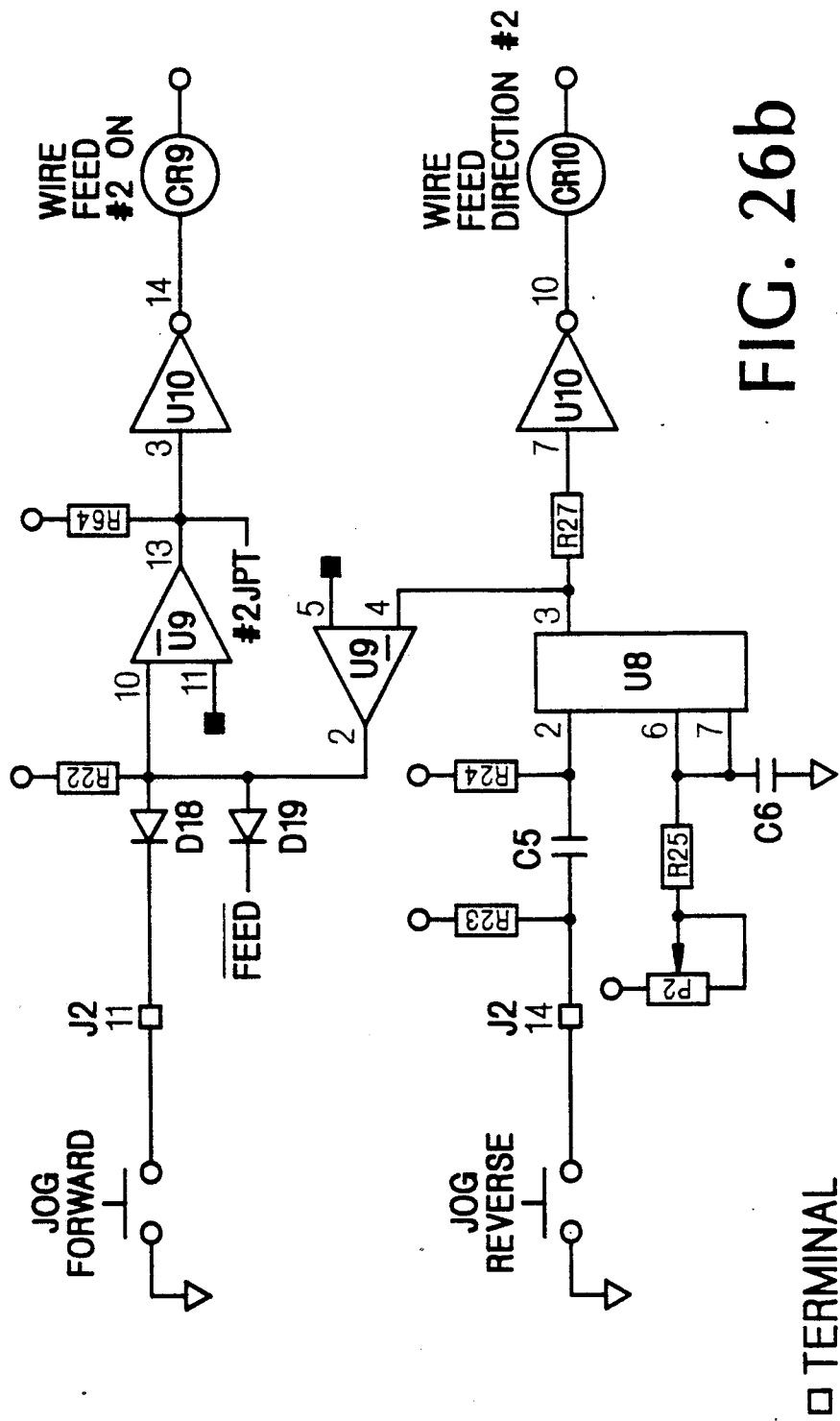
Figure 26C:
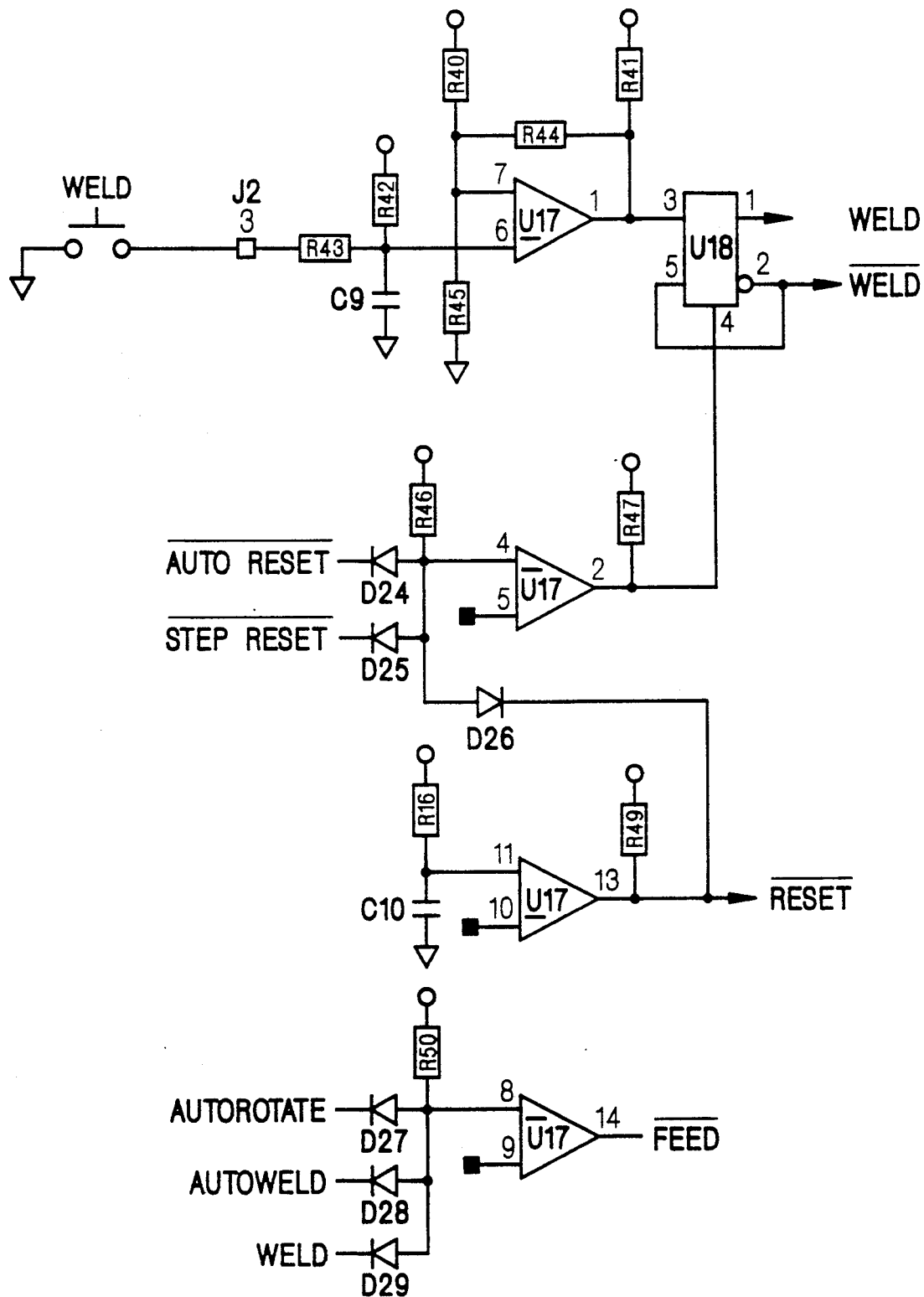
Figure 26D:
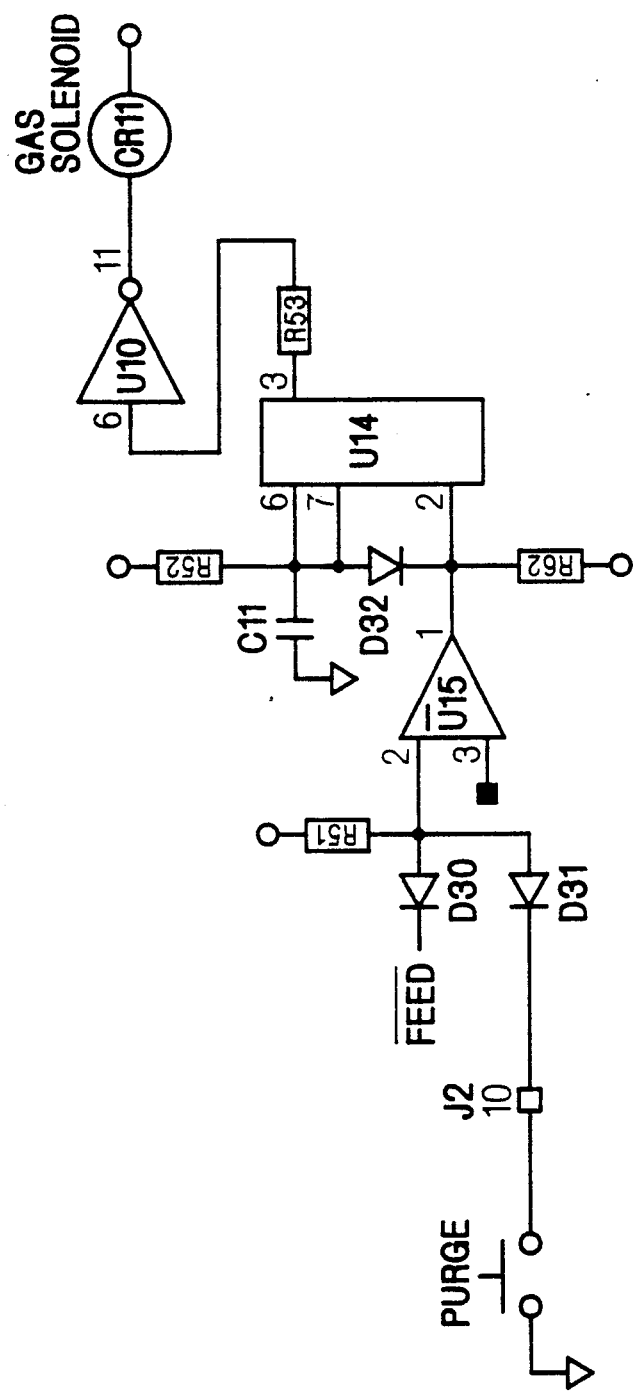
Figure 27A:
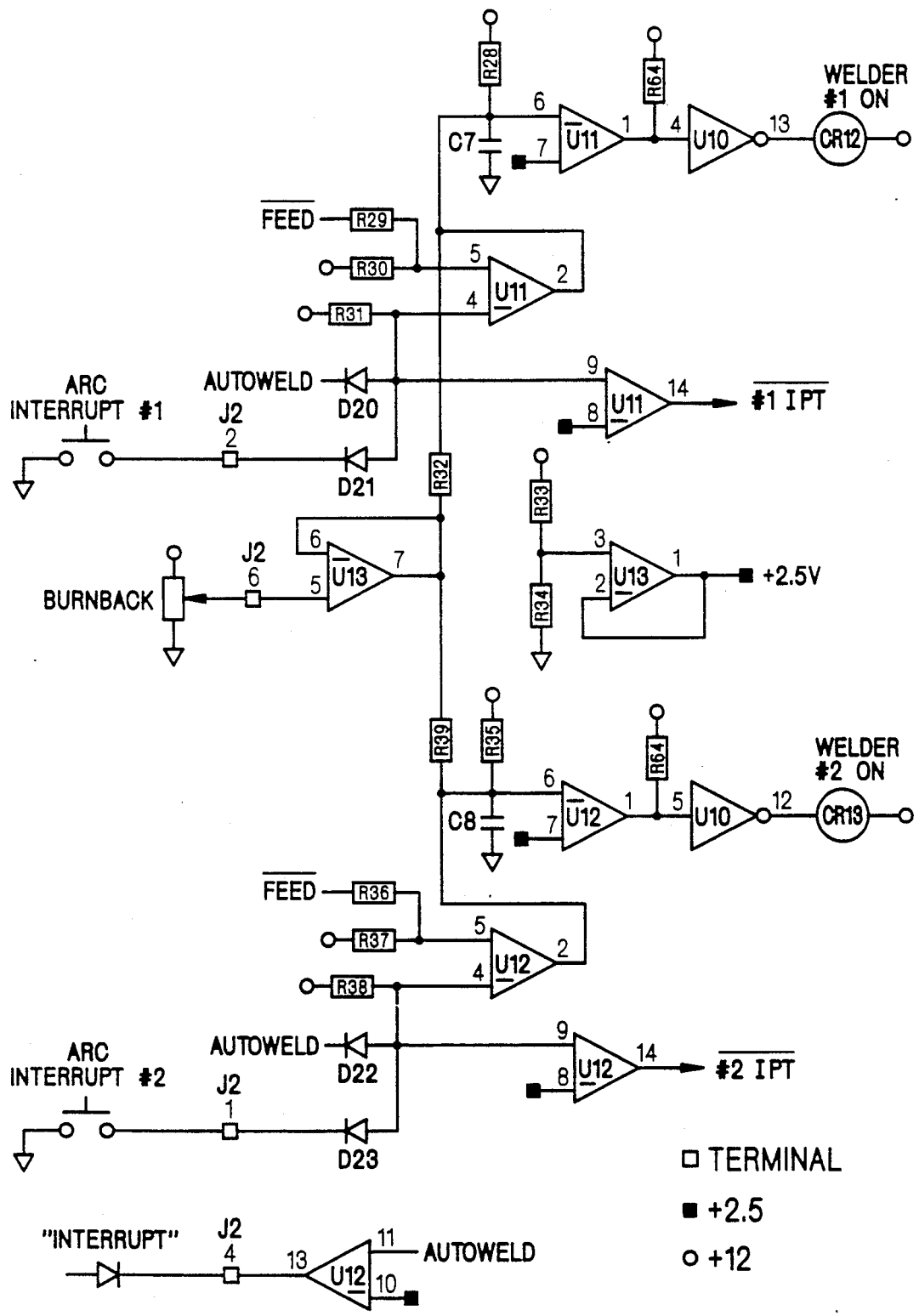
FIGS. 27a and 27b are electrical schematic diagrams for the welder and limit control functions of the welding apparatus of the invention.
Figure 27B:
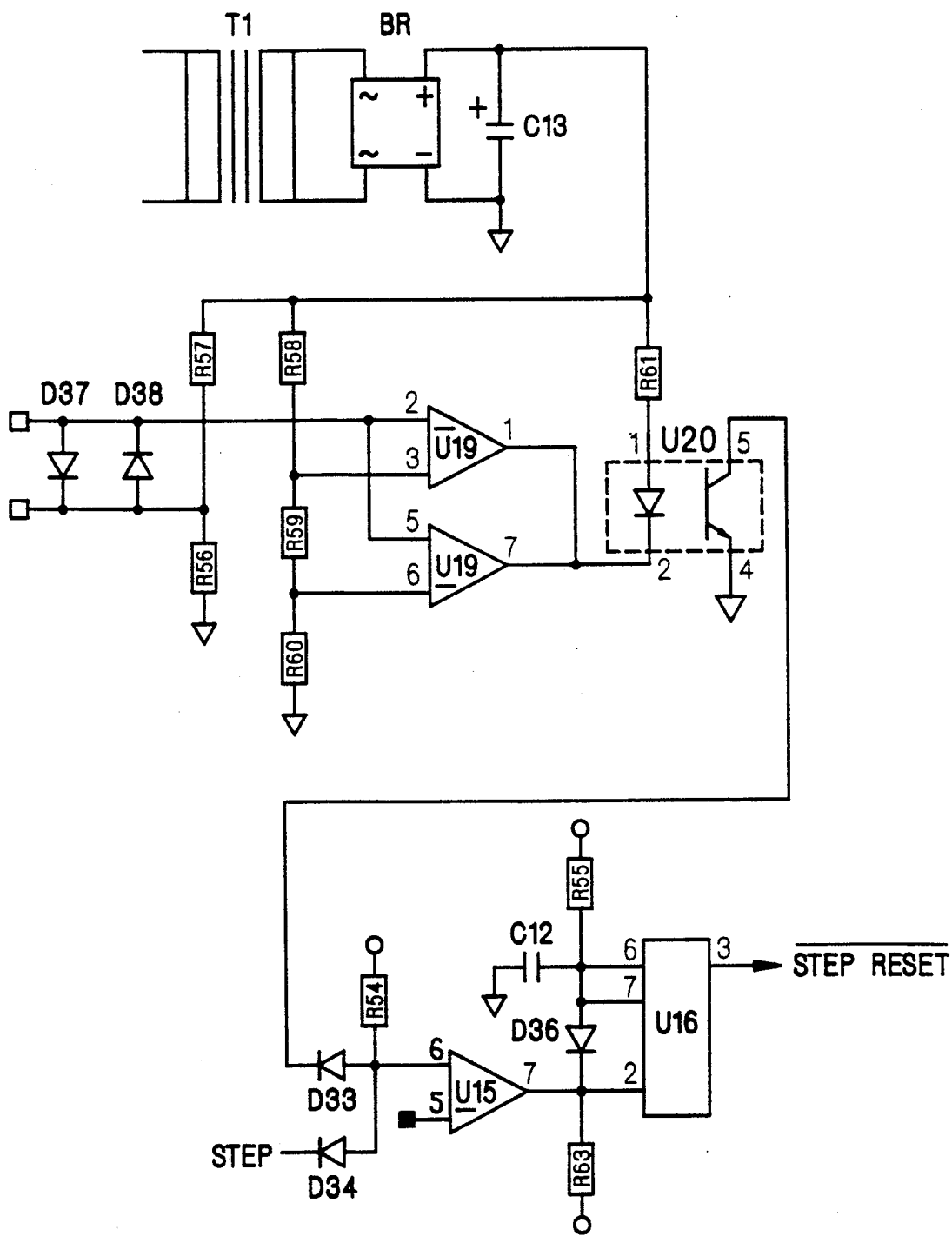
Figure 28A:
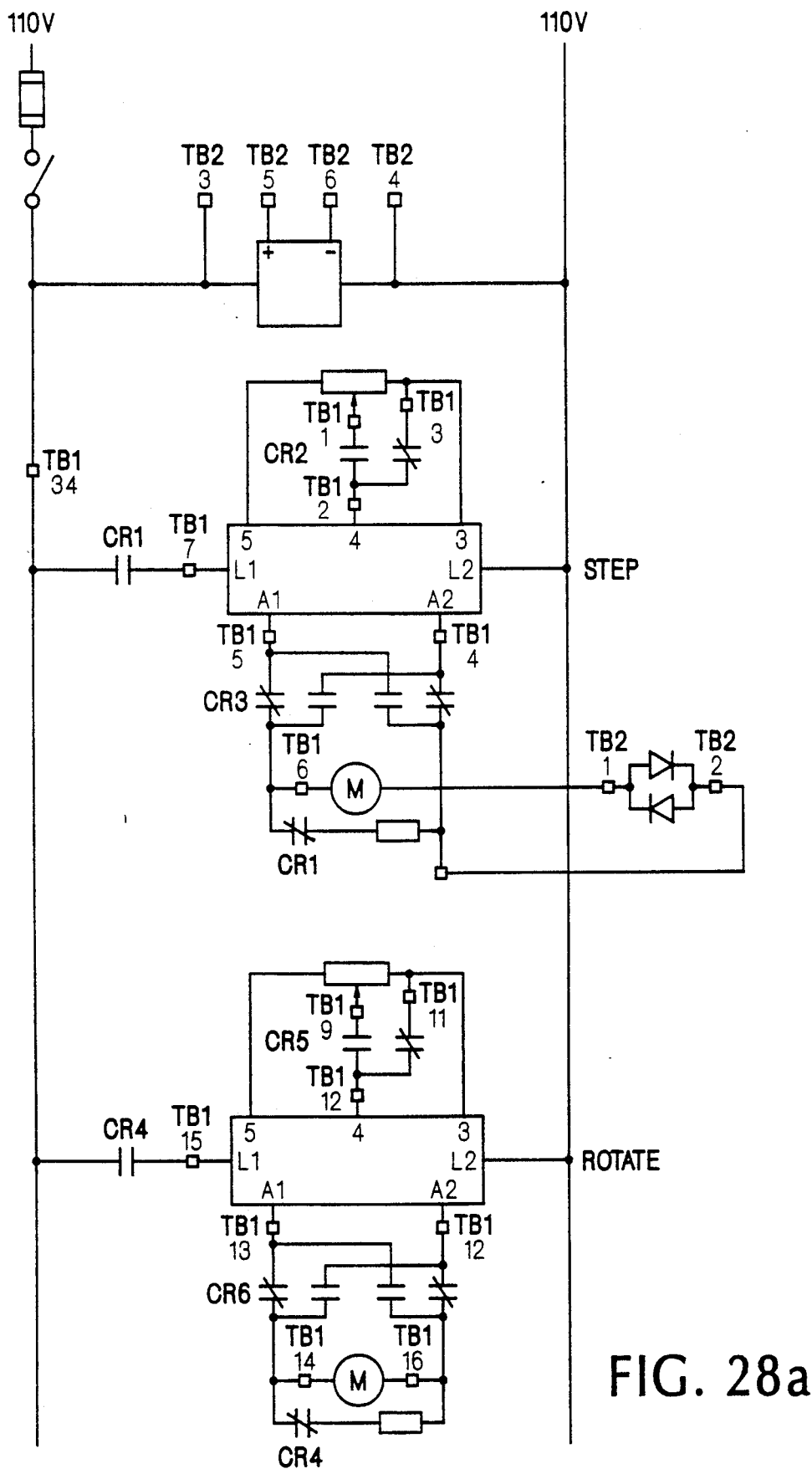
FIGS. 28a and 28b are electrical schematic diagrams for the motor and welder control functions of the welding apparatus of the invention.
Figure 28B:
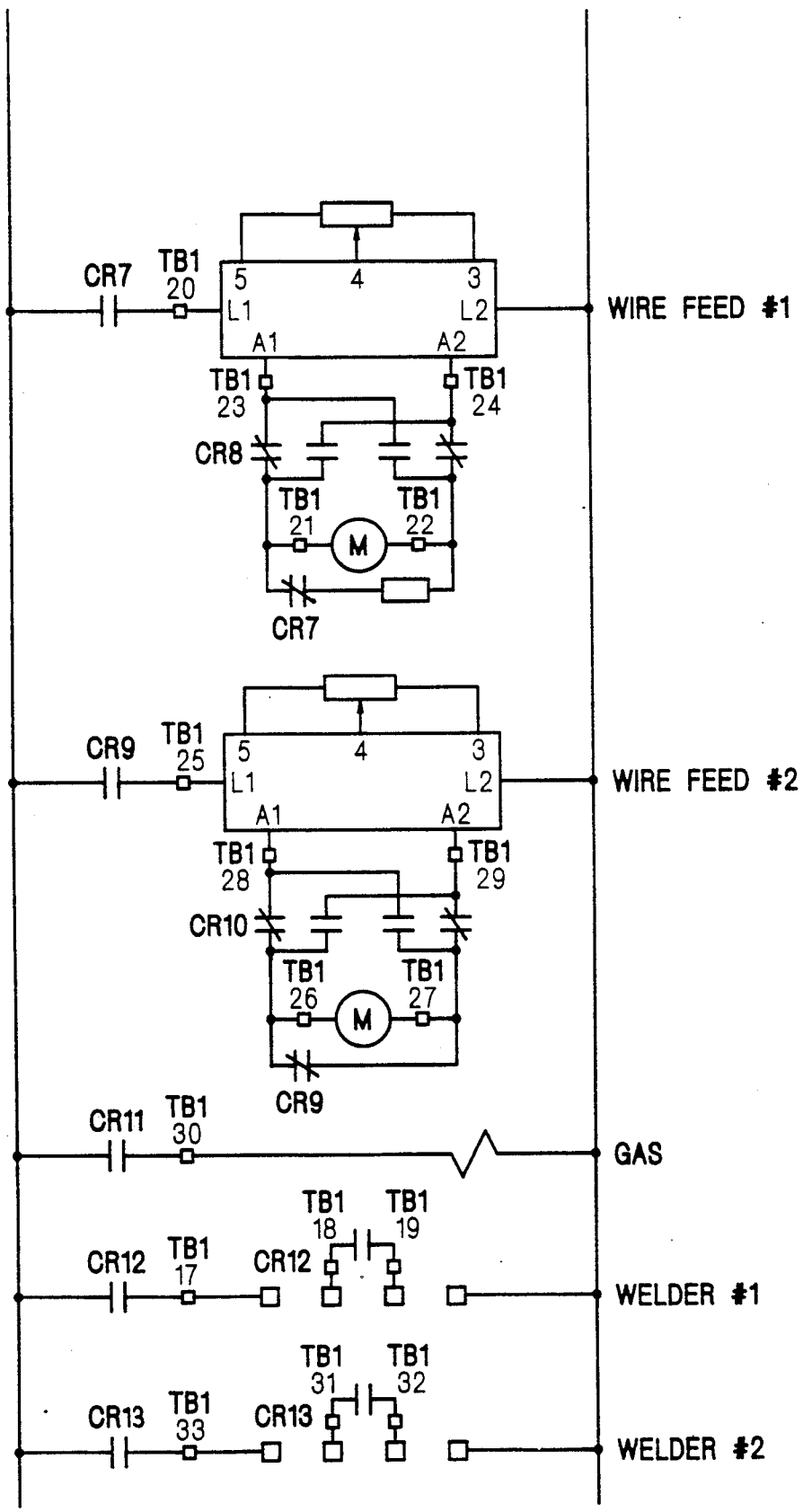
Figure 29A:
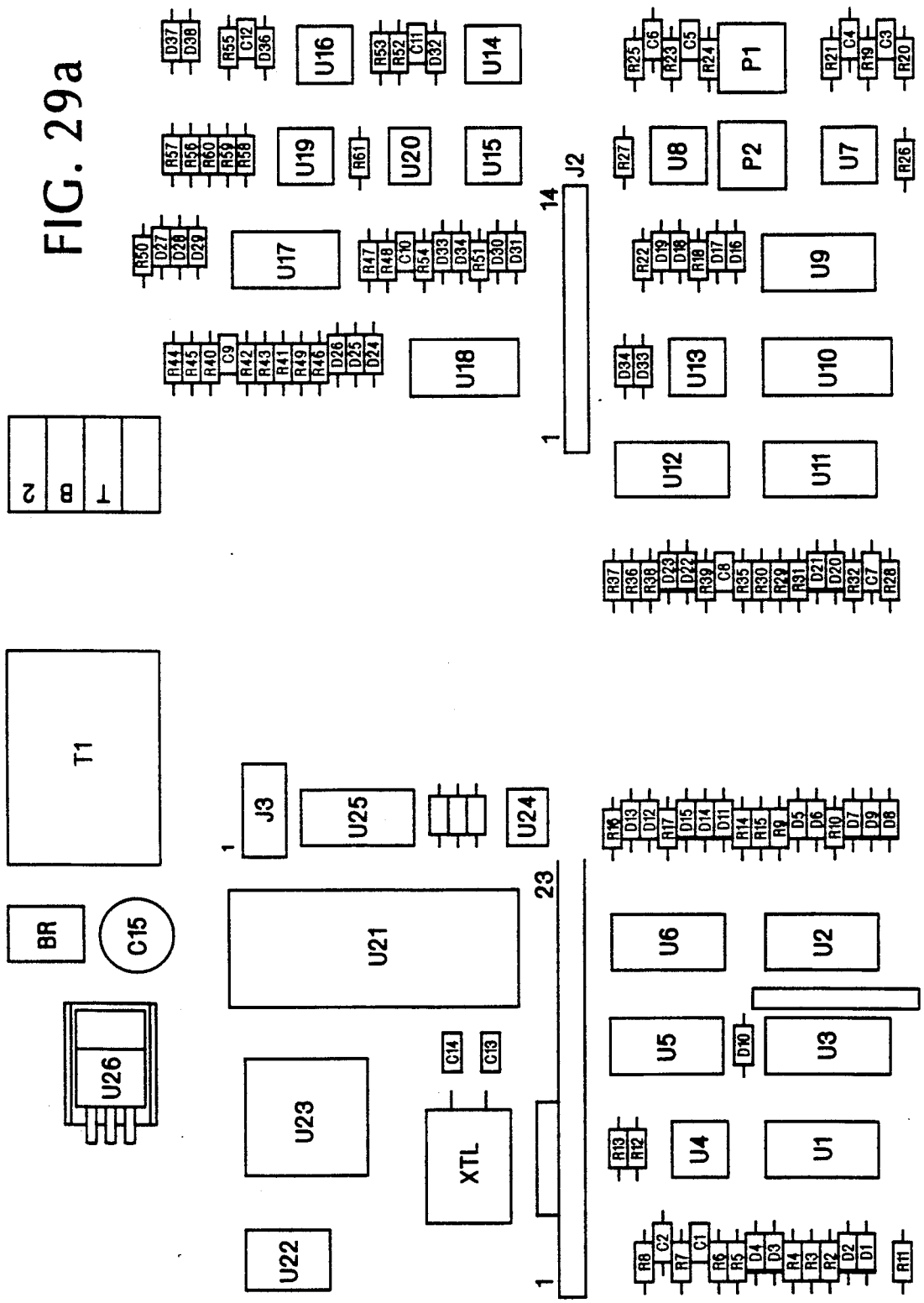
FIGS. 29a and 29b are a schematic diagram of the PC board assembly for the welding apparatus of the invention.
Figure 29B:
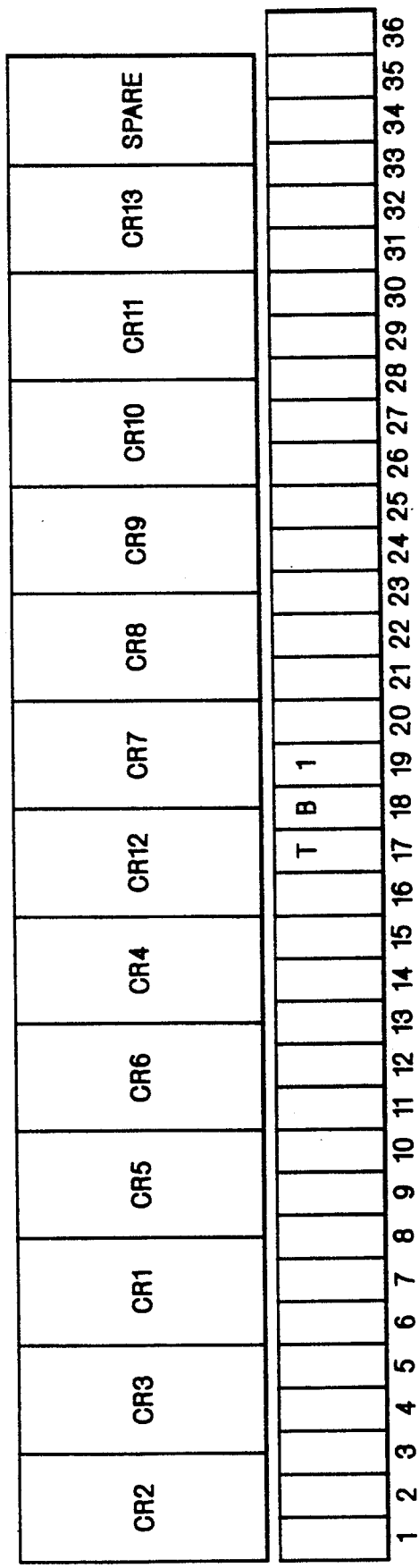

Welding current for the welding process in passed to the rotating welding torch 64 assembly (FIGS. 11-13). The welding current passes through a cable lug 66 from a power cable 150 from a remote welding power supply (not shown) and into the non-rotating part 70 of a rotatable power connector assembly 68 (FIG. 7). The current then passes through the interface I between the metallic non-rotating portion 70 and the metallic rotating portion 72 of the rotatable power connector assembly 68. The current next passes into a cable lug 74, through a cable 116, quickie coupling 292 and into cable 116' leading to a cable lug 76 at the rotating torch assembly 64. The cable attachment to the power connector assembly 68 is made on the outside diameters of the power connector parts 70, 72. Electrical insulators/spacers 78 and 79, 79' are provided to isolate the spindle 24 and the head assembly 12 from electric welding current.

Shielding gas for the welding process passes through a hose (not shown) connected to a hose fitting 152 in port 80 of the non-rotating portion 70 of the rotatable power connector assembly 68, into a cavity 82 defined within the connector assembly part 70 (FIG. 7), into an adjacent connected cavity 84 within the rotating portion 72 of the rotatable power connector assembly, and then through port 86 and fitting 154 to hose 87 which terminates at fitting 218 at wire feeder 100 (FIG. 11). The chambers 82, 84 are sealed by shaft seals 156, and by bushing seal 157 engaging on power connector bushing 158. In order to further prevent gas leakage, and to provide the required contact for electrical transmission, a compression spring 88 bearing between head coupling 38 and spring block 160 is used to maintain adequate normal force (arrow C). An electrically conductive grease is also placed at the interface I to improve the gas seal and to increase electrical conductivity, the bushing seal 157 serving to retain the grease and to restrict escape of gas from chambers 82, 84.

In one embodiment (FIGS. 2 and 3), a step switch 90 mounted on the head assembly 12 is activated once every revolution by a detent 92 in the spindle pulley 50, or by other means. When the step switch is tripped, it activates a step sequence of a control box 178 (FIG. 9), which causes that torch assembly 64 to be moved axially a small distance, as will be described more fully below. In another embodiment (FIG. 5), a signal is provided by an encoder 162 mounted on frame 44, which is connected to the motor 42 by means of encoder belt 164 engaged about encoder pulley 166.

Referring to FIG. 8, the head assembly 12 further includes a shroud assembly 168 consisting of a shroud 170 and a shroud base plate 172, and further contains a solenoid assembly 174.

Figure 10:
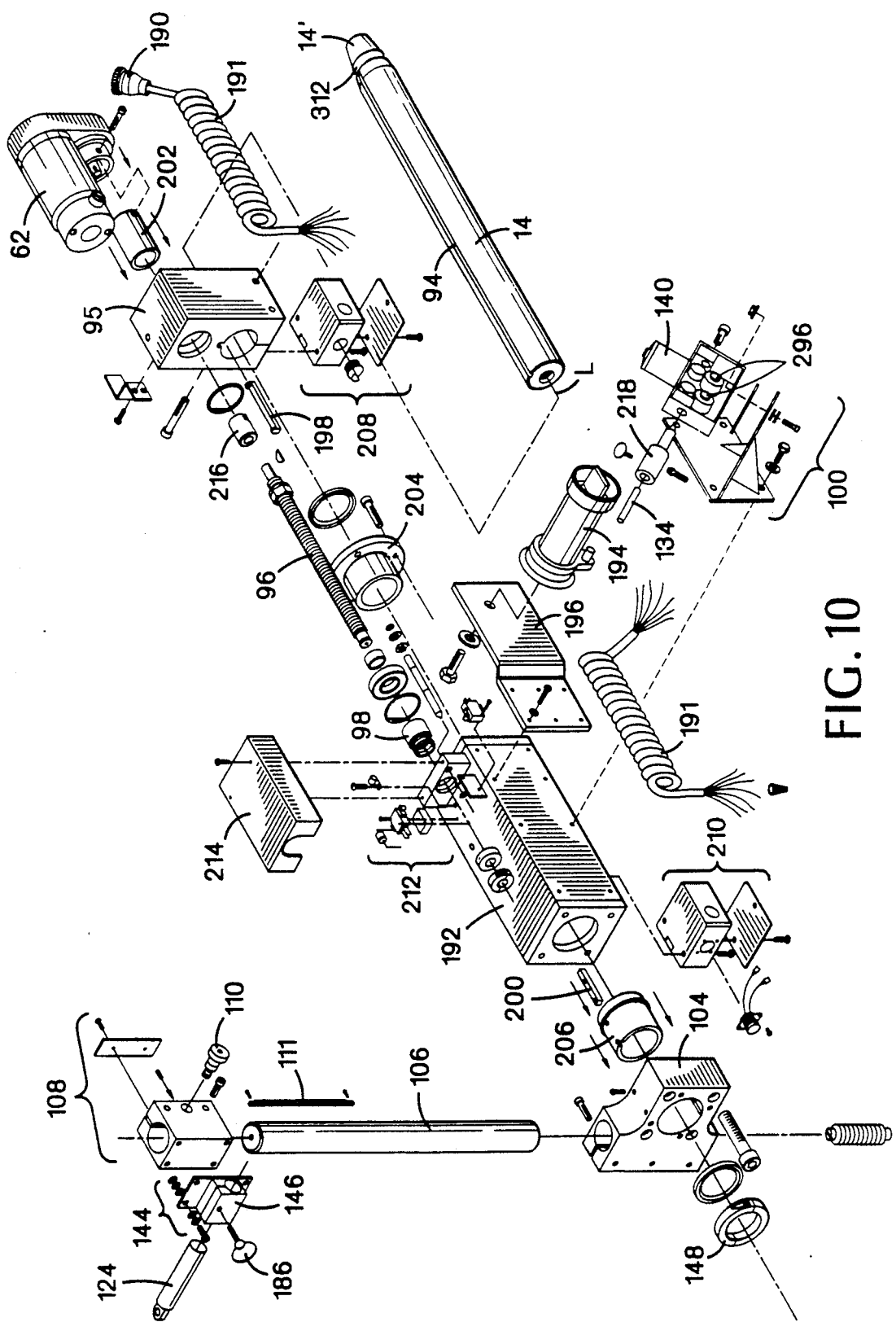
FIG. 10 is an exploded perspective view of the lower assembly of the welding apparatus of FIG. 1.

Referring now to FIG. 2 and also to FIG. 10, the line shaft 14 acts as the backbone of the welding apparatus system 10 of the invention, and it keeps major components, i.e. the head assembly 12, the step assembly 16 and the traveling assembly 18, in the proper spatial relationship and coaxially aligned.

The step assembly 16 and the traveling assembly 18 are mounted upon the line shaft 14, with the line shaft extending through step motor adapter bushing 202, top housing guide 204 and keyed bushing 206. The step assembly 16 and the traveling assembly 18 are fixed against rotation relative to the line shaft 14 by means of engagement of step block key 198 and traveling assembly key 200 (of keyed bushing 206) in keyway 94 running the full length of shaft 14. In this manner, the line shaft rotate the step assembly and traveling assembly in unison about the axis L of the line shaft.

The step assembly is secured onto the line shaft by clamping provided by step housing 95 in a manner to axially fix the position of the step assembly relative to the line shaft, and it moves the traveling assembly 18 axially along the line shaft 14 for initial positioning, and for stepping the torch assembly 64 (FIGS. 11 and 12) axially along the surface 36 during the welding process. The step assembly 16 includes a gear (step) motor 62 that rotates an axially fixed threaded rod or lead screw 96, having one end secured in a keyed coupler 216 and a second (lower) end which is engaged through a bronze threaded nut 98. The nut is affixed to the housing 192 of traveling assembly 18 in the region of limit switches 212 (within cover 214), thereby causing the traveling assembly to move axially along the line shaft 14 when the step motor is activated.

The step assembly 16 can also be moved axially on the line shaft 14 for repositioning purposes by use of a, e.g., locking collar 99 for clamping the traveling assembly to the line shaft in order to prevent the traveling assembly 18 from moving. The clamping of step housing 95 is then released, freeing the step assembly to cause it, rather than the traveling assembly 18, to move moved axially along the line shaft when the threaded rod 96 is rotated relative to the fixed nut 98.

The traveling assembly 18 provides support for a wire feeder 100, a wire spool or reel 102 (mounted on wire spool spindle 194 on bracket 196 affixed to traveling assembly housing 192) and the torch assembly 64. Placing the wire reel and the wire feeder on the rotating traveling assembly with the torch assembly within the bore 34 provides for more stable wire movement, and thus a higher quality build-up, without straightening the wire. Since the wire reel 102 and the wire feeder 100 are rotated with the welding head and torch, there is no relative rotation between the wire and the torch contact tip, and no relative motion between the wire reel 102, the wire feeder 100, and the welding head or torch assembly 64. Since the entire welding mechanism is being rotated together, it behaves as if it were standing still.

The traveling assembly 18 also permits coarse radial adjustment of the position of the torch assembly 64. By loosening radial arm support housing 104 and sliding radial adjustment rod 106 therethrough, the torch assembly can be adjusted to a bore size within the range of the length of the particular radial adjustment rod that is being used at the time. A set of adjustment rods (e.g. four) of different lengths (e.g. 16 inches, 24 inches, 38 inches and 60 inches) allow the apparatus to accommodate a range of bore diameters, e.g., from 12 inches to 144 inches.

A fine adjustment assembly 108 mounted on the traveling assembly 18 also permits fine radial adjustment of the position of the torch assembly 64. Rotation of radial adjuster knob 109 rotates a pinion assembly gear 110 engaged in rack 111 defined in the surface of rod 106 to move the fine adjustment assembly (and thus the torch) along the radial adjustment rod 106 in a substantially radial direction with respect to the bore surface 36.

Referring now to FIGS. 11-13 (showing the torch assembly 64), the body 114 of the torch 112 acts as an electric current bus for the welding current from the welding cable 116' to the welding wire 118. The path is from cable lug 76, to the torch holder 122, to the torch body 114, to the diffuser 126 to the contact tip 128, which transfers the electric current to the welding wire within the nozzle 142. The torch holder 122 is formed of two parts, secured by torch clamp handle 180 on stud 182.

Torch support rod or arm 124 in torch support bracket 146 (secured by thumbscrew 186) of the torch assembly 64 also permits angular adjustment of the position of the torch assembly to allow an optimum angle of attack of the welding wire to the surface 36 of the work piece. The torch assembly 64 also guides the welding wire 118 to weld zone, Z. The wire passes from the wire feeder 100 through flexible wire feed conduit assembly 130 (FIG. 14), and into the torch body 124 and diffuser 126 before entering the contact tip 128. Wire support is provided in all components except for the tip by means of a flexible liner 132 which supports the wire radially to keep it from buckling under its column loading. This flexible liner is within an axially rigid hose 134 having a wire feed end nipple 140 and torch union fitting 189.

The torch assembly 64 also provides transmission of shielding gas for the welding operation to the weld zone. The gas passes from the rotatable power connector assembly 68 at port 86 and nipple 154, through gas hose 87 to wire feeder conduit fitting 140, through the flexible wire feeder conduit outer hose 134, through the torch body 124, and then to the diffuser 126 where it is allowed to enter the cylindrical cavity formed by the nozzle 142. The gas then exits, shielding the welding process from the atmosphere.

The torch assembly also provides means for conducting or syphoning heat away from the contact tip 128 and nozzle 142. The mass and heat conduction properties of the heavy brass torch body 114 transfer heat away from the contact tip 128 rapidly, thus allowing the heat to dissipate into the cooler air through the increased surface area of the torch body.

The torch assembly 64 also provides electrical isolation of the torch from the rest of the welding apparatus by means of a nonconducting insulators 144 disposed between torch support bracket 146 and the radial slide block 184 of fine adjustment assembly 108.

Optionally, the welding apparatus 10 may include a tail end support bearing 148 to provide additional radial support for the free end of the line shaft 14.

Referring now to FIGS. 15 through 22, the shaft or bar coupling 38 of the invention includes a body 300 defining a first axial bore 302, which is threaded for engagement with the end of the spindle 24, and a second axial bore 304, which is tapered for sliding engagement with the tapered end 14' of the line shaft 14. The first axial bore intersects a transverse bore 306 containing electrical connector 58 for passing control circuitry from within the spindle to components of the lower assembly (FIG. 10) of the welding apparatus 10 of the invention. The surface 308 of the coupling about the second axial bore is tapered. Two threaded bores 310, 310' are defined through the surface 308 to intersect with the second axial bore 304. Two clamping screws 276 disposed within the threaded bores 310, 310' engage upon the surface 311 of a groove 312 formed in the surface of the tapered portion 14' of the line bar or shaft 14. The coupling body 300 further defines a cross hole 284 which contains a removable safety pin 314 that also engages in the line shaft groove 312 to resist separation of the line shaft 14 from the coupling 38. The body 300 of the coupling 38 defines a stepped cross hole 316, which intersects the base of the second axial bore 304. Disposed for reciprocating movement within the cross hole 316, transverse to the axes of the spindle 24 and line shaft 14, is a knockout pin 318 consisting of a first large diameter pin portion 320 and a second smaller diameter pin portion 322, each having an enlarged head portion, and a spring 324. The knockout pin is assembled with the body 300 of the coupling by inserting the pin portions 320, 322 from the opposite ends of the hole 316, and engaging the threaded end of the second pin portion 322 within the threaded bore defined for that purpose in the end of the first pin portion 320. The spring is disposed under compression between a radial flange 32 defined by the first pin portion 320 and the outer surface 328 of the body 300 of the coupling 38 to bias the knockout pin 318 to the retracted position shown in FIG. 20, with the head 330 of the second pin portion engaged upon the shoulder of the cross hole 316.

To release the tapered end 14' of the line shaft 14 from the bore 304 of the coupling, the head 332 of the knockout pin 318 is struck to cause the tapered surface 334 of the first pin portion 320 to engage in ramping motion with the opposed surface 336 of the line shaft 14, thus to urge the line bar 14 and coupling 38 apart.

In summary, the major assemblies of a welding apparatus of the invention include the following:

Mounting plate 23 (FIG. 4) provides support for the welding apparatus and also permits leveling and centrality adjustment.

Head assembly 12 (FIG. 3) provides support and imparts rotary motion to the line bar 14. It also transfers welding current, wire feeder current, step motor current and shielding gas from stationary components to rotary components.

Line bar 14 (FIG. 10) provides support and orientation for the step assembly 16 and the traveling assembly 18. It also transfers rotary motion to both assemblies and, through its length, determines the total length of axial motion possible.

Step assembly 16 (FIG. 10) supports and rotates the lead screw 96, which in turn imparts axial motion to the traveling assembly 18.

Traveling assembly 18 (FIG. 10) supports, provides adjustment of and transfers rotary and axial motion to the radial rod 106. Also supports the welding wire reel 102. This assembly also includes the wire feed mechanism 100.

Radial rod 106 (FIGS. 2, 10 and 11) provides support, and transfers axial and rotational motion to the radial slide block assembly 108. Through its length, the radial rod provides radial location of the torch.

Radial slide block assembly 108 (FIG. 10) provides support for the torch 64, small radial adjustments, torch angling for optimum welding angles, attachment of the welding current cable 116' and welding current transfer to the torch.

Wire feed conduit 130 (FIG. 14) allows the passage of wire and shielding gas from the wire feeder to the torch.

Torch 64 (FIGS. 11-13) provides for the transfer of welding current to the welding wire, and introduction of the shielding gas to envelop the weld.

Also, a gas hose allows for the quick connection and remote location of the shielding gas tank, a gas regulator determines the flow of gas, a power cable provides for the transmission of welding current from the power supply to the welding apparatus and a welding power supply provides the current necessary for the welding process (suggested minimum output capacity is 400A).

Control box 178 (FIG. 9) controls all the welding functions. It contains the motor controls for the wire feeder motor, step motor 62 and rotation motor 42. The control box also connects with the welding power supply to operate its contactor and control its voltage output. Control cables connect the control box with the Welding power supply and welding apparatus.

A storage box may also be provided to assure safe transportation and storage of the welding apparatus.

The control box 178 (FIG. 9) provides means for control of the operation of the step motor 62 in a manner to provide axial motion for the step sequence during welding, and axial jogging during set-up and positioning. The control box also provide means for control of the operation of the rotation motor 42 to cause it to rotate the welding assembly (i.e. line shaft 14 and the attached step assembly 16, traveling assembly 18 and torch assembly 64) within the bore, both for welding and for setup purposes. It also provide means for control of the operation of the wire feed motor 60 to pull wire from the wire reel 102 and push it to the torch, again, both for both welding and for set-up purposes. The control box also operates a shielding gas solenoid assembly 174 (FIG. 8) to control the flow of the shielding gas to the weld zone, and it controls the electrical contactor and the output voltage of the remotely located weld power supply.

Integration of these functions forms a weld sequence by determining the proper rotation rate, wire feed rate, step speed and duration (step size), gas control, and weld power supply control. The weld sequence also contains the proper weld start and weld end parameters and timers.

Figure 9:
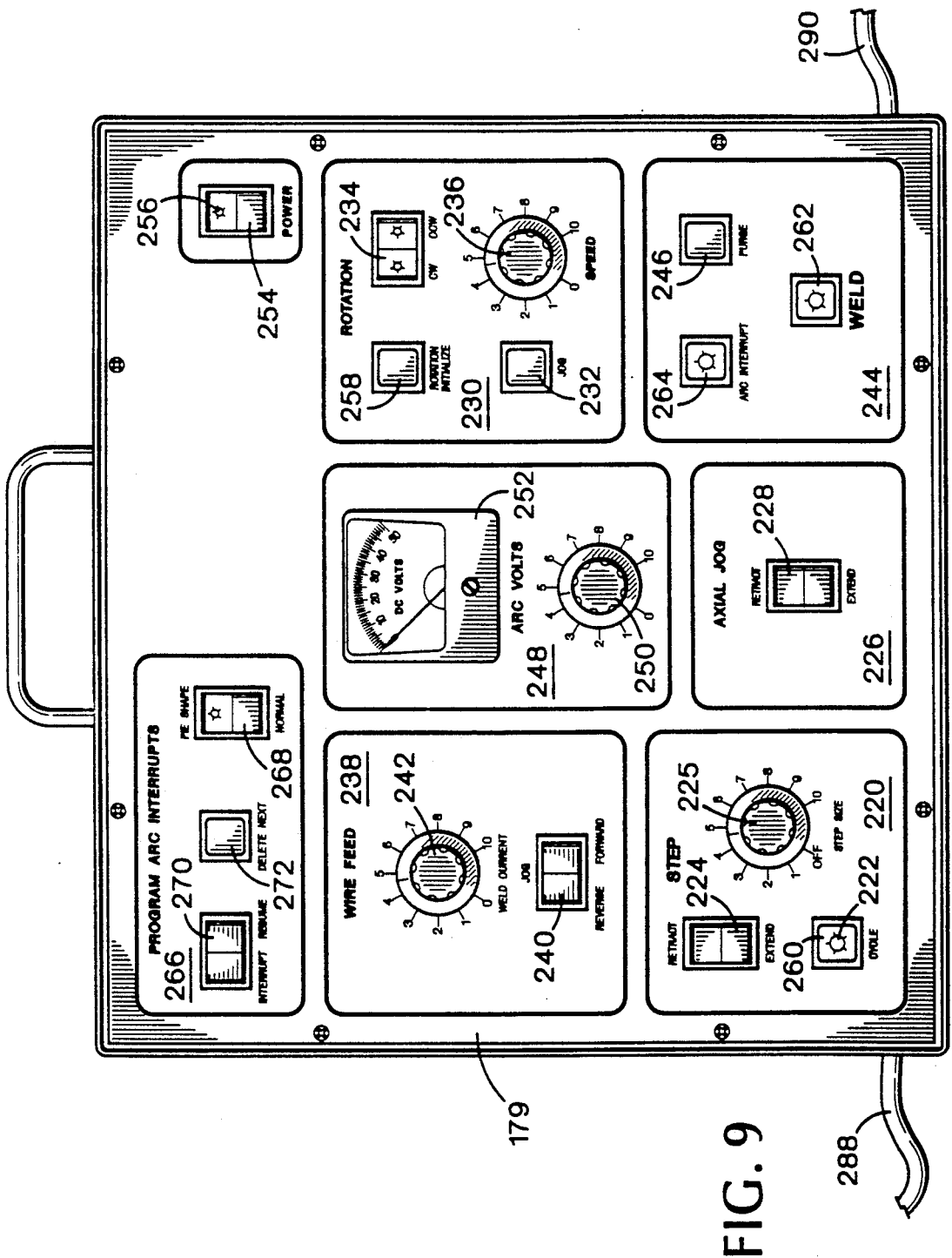
FIG. 9 is a face view of a control box for the welding apparatus of FIG. 1.

Referring now to FIG. 9, and also with reference to the electrical schematic drawings (FIGS. 23 through 29), the functional features displayed on the control box will now be described.

The STE function (220) relates to the axial motion of the apparatus during the weld cycle, which occurs once during each revolution. The magnitude of each step can vary from 0.100 inch to 0.400 inch, and the function may be "off" (0 inch). Step adjustment at the front panel 178 changes the time that the step motor is activated, thereby giving the magnitude range listed above. The step speed is approximately 0.045 inch/second and it is not adjustable from the front panel. Each step is initiated by a marker pulse received by the control box from an encoder 162 (FIG. 5) geared 1-to-1 with the spindle 24. (During the entire duration of the step, a light 222 is illuminated on the control panel.) The direction of each step (extending or retracting) is determined by switch 224 on the front panel 178. The axial motion motor is 90 v dc and requires dynamic braking.

The AXIAL JOG function (226) relates to axial motion of the apparatus during positioning and alignment. The AXIAL JOG switch 228, located on the front panel 178, can be activated at any time, including during welding. (The speed of motion is not adjustable from the front panel.) When the AXIAL JOG function is activated during welding, the axial jog speed is the same as when stepping. When activated at other times, the axial jog speed is as fast as possible. If activated during stepping, the axial jog overrides the step, e.g., if the step is retracting and the extend button is pushed, the traveling assembly extends.

The ROTATION function (230) relates to rotary motion of the apparatus during welding, and also to positioning and alignment. Rotation jog is activated by means of switch 232 on the front panel 178. The direction of rotation, and the speed of rotation, are set by switch 234 and dial 236, respectively, also at front panel 178. The speed range for stable rotation is more than 10:1. The rotation motor 42 is 90 v dc.

The WIRE FEED function (238) relates to pushing the welding wire 118 through conduit 130 to the welding tip (FIG. 13) during set-up and welding. Wire jog, both forward and reverse, is activated by switch 240 on the front panel 178. Depression of the switch for forward jog causes continual jogging at the "set" speed. Depression of the switch for reverse jog causes wire feeder to reverse at the "set" speed for a preset time, e.g., one second. A second depression causes another reverse jog for the preset time, continuing, ad infinitum. The preset time is not adjustable from the control panel. The speed of wire feed is also set at front panel 178 by means of speed knob 242. The wire feeder motor 60 is 42 v dc, and it requires stiff dynamic braking.

The PURGE function (244) relates to operation of the shielding gas solenoid valve 174 (FIG. 8). The valve, which allows the flow of shielding gas to purge the gas line just prior to welding and to shield the arc, is activated by means of switch 246 on the front panel 178. As described above, the solenoid valve is located inside apparatus shroud 168. A timer continues the flow of gas for approximately 5 seconds following release of the purge button or the end of welding, whether the solenoid is activated by the purge button or by the welding circuit. The solenoid is activated by 120 v ac.

The ARC VOLTS function (248) relates to control of the voltage output of the welding power supply. It includes a 10 k ohm potentiometer actuated by dial 250 (one turn) located on front panel 178. A volt meter 252 displays the welding arc voltage over a range of 0 to 50 volts.

Power switch 254 provides power to the control box circuits and contains an LED 256 which indicates when the circuits are "powered up".

Burnback time is the period that the power supply remains on after the welding wire is stopped. This function is adjustable from the side of the control box 178 with a screwdriver. The range of time available is 0.025 seconds to 0.200 seconds, and off (0 seconds).

The ROTATION function (230) further relates to positioning of the torch at the step position for the start of the weld. (A step does not occur during this rotation.) The function is actuated by means of switch 258 on the front panel 178. Rotation continues until the control box receives the marker pulse from the encoder 162, then rotation stops automatically.

The STEP function (220) further includes a cycle button 260 which is depressed to cause the apparatus to step the set amount. This function can be activated during operation or during set-up, and it does not affect automatic stepping which occurs each revolution. The button contains the LED 222 which is illuminated during the entire duration of a step, i.e., both an automatic step or a cycle button activated step.

The WELD function (244) includes button 262 on the front panel 178. In order to MIG weld, a number of functions have to be properly coordinated. Following depression of the WELD button 262. when the apparatus is properly set-up but not welding, the power supply contactor is activated by either completing a circuit or supplying 120 v ac. Activation of the power supply contactor will cause a potential difference between the welding wire and the workpiece, thereby resulting in the flow of welding current and welding. The potential difference (voltage) level will be whatever is set at the front panel. Rotation at the "set" speed begins. A step of the "set" magnitude occurs after one revolution, and each revolution thereafter. Following a "soft" start, wire feeds at the "set" speed. Changes in the above can be made while welding is progressing. The gas solenoid is activated, and remains activated.

In order to stop welding, as with starting, a number of functions have to be properly coordinated. Following depression of the WELD button 262 on the front panel while welding, the power supply contactor is deactivated (after elapse of the burnback time). Rotation, stepping and wire feeding stop. The gas solenoid timer is allowed to run down, and stop the flow of gas.

The manual ARC INTERRUPT function (244) is actuated by button 264. This is done only during welding to stop the welding process, but not the rotation or step process. Interruption only continues as long as the ARC INTERRUPT button is depressed. Activation of the arc interrupt during welding causes the wire feeding to stop. The power supply contactor is deactivated (after elapse of the burnback time). The gas solenoid timer runs down, and stops the flow of gas.

Manual arc interrupt deactivation is effected by releasing the ARC INTERRUPT button 264. Deactivation of the arc interrupt causes wire feeding to start as it does when welding is commenced. The power supply contactor and the gas solenoid are activated.

The PROGRAM ARC INTERRUPTS function (266) includes the PIE SHAPE/NORMAL button 268 which cause the apparatus to operate in two basic modes. In the NORMAL position, the apparatus turns continuously in one direction, stepping the set amount each revolution. In the PIE SHAPE position, the apparatus alternately turns CW (clockwise) and CCW (counterclockwise), as observed from the head end of the apparatus, ad infinitum. The ends of the CW/CCW rotations of the torch are always at the "set"location until changed (see below). At the end of CW/CCW rotation, rotation in the opposite direction is not started immediately. First, the torch and welding are stopped and, second, the apparatus steps the "set" amount. Only after the step is completed does rotation and welding begin.

The PROGRAM ARC INTERRUPTS function (266) further includes the INTERRUPT/RESUME button 270 (Normal Mode). Depression of button 270 for the INTERRUPT mode causes welding to stop as described in the manual ARC INTERRUPT section above, except that release of the button 270 does not terminate the interruption, and the apparatus will go into the ARC INTERRUPT Mode at the same angular location, unless changed or deleted as described below, for all subsequent torch rotations. Also, the apparatus rotational speed is increased to maximum following depression of button 270, and after all subsequent returns to the same location, and stays at that speed until interruption is terminated. Depression of the button 270 for the RESUME mode causes the rotation speed to return to that set by the ROTATION speed dial 236, and welding, etc. to take place as described above in the manual ARC INTERRUPT deactivation section above. As with the description of interruption above, welding will be resumed at all returns to the same angular location for all subsequent torch rotations unless changed or deleted as described below. Up to 16 pairs of INTERRUPT/RESUME locations (markers) can be inserted around the circumference of a bore. Each time the apparatus revolves, these markers will continue to interrupt welding and resume welding at the same location. INTERRUPT/RESUME markers can be set before welding, during the set-u phase, or while welding.

The PROGRAM ARC INTERRUPTS function (266) further includes the INTERRUPT/RESUME button 270 (Pie Shape Mode). Depression of the button 270 for the INTERRUPT Mode causes one edge of the pie shaped segment to be defined, the edge which is farthest CCW when viewed from the head end of the apparatus. Depression of the button for the RESUME Mode causes the CW edge of the pie shaped segment to be defined. These markers will continue to define the extreme edges of the weld segment until changed.

The PROGRAM ARC INTERRUPTS function (266) also includes the DELETE NEXT button 272 (Normal and Pie Shape Modes). Depression of the DELETE NEXT button 272 will eliminate the next marker regardless whether an INTERRUPT marker or a RESUME marker. This allows markers to be reset when the torch reaches the desirable new edge or change-of-state. If a new marker is not programmed, the marker no longer paired will automatically be eliminated when it is passed by the torch.

The apparatus connector is an Amp 37 pin. The power supply connector is an Amp 14 pin. The auxiliary connector is an Amp 14 pin.

According to the invention, the welding apparatus 10, which weighs about 200 to 300 lbs., is transported to a site of the workpiece to be repaired. Then, typically using lifting equipment available at the site, the apparatus is set-up on the workpiece by fixedly mounting the flange 22 of the housing 20 upon a surface external of the bore 34, which defines the internal surface 36 to be repaired. The flange is clamped or bolted to a surface 32, e.g., a part of the article being welded, the floor, or some other solid object, in a manner to align the plane F of the flange perpendicular also to the axis of the surface to be repaired.

The welding apparatus 10 is an automated welding device that uses a rotating and axially stepping torch in conjunction with the MIG process to buildup the surface, e.g. of a bore, by depositing contiguous weld beads around the bore circumference. Differences in bore diameter are accommodated by radial rod selection, and/or adjustment of the radial slide block. During the set-up phase, the operator is required to align the apparatus to the bore, adjust the torch to provide the proper torch/bore clearance, and to make the initial control settings. During welding, operator input is required to start and stop the machine, and to remain in visual contact with the welding process in order to make the minor adjustments in the rotational speed, voltage and wire speed necessary to maintain good weld quality.

In addition to continual buildup of the bore, the operator can manually interrupt the arc at locations where it is undesirable for buildup to occur. It is also possible during the set-up phase or during welding to program the machine to interrupt the arc at specific sectors of the continual circular path, or to weld one sector with an alternating clockwise, counter-clockwise motion.

Numerous weld power supplies can be used; however, to utilize the full potential of the welding apparatus 10, a minimum continuous welding current of about 400 amps should be available. The power supply must be of the constant voltage (CV) type (the type suitable for MIG welding), and it should have remote voltage control capabilities.

The welding apparatus is equipped with a power supply control cable having a connector on one end for attachment to the control box. The other end must be attached directly to the power supply, or to a connector that will mate properly with the power supply to be used.

The welding apparatus is capable of interfacing with power supplies providing contactor actuation current, and those that do not. It is important to know the requirements of the power supply to be interfaced with the welding apparatus before attachment is attempted. Improper connection may result in dangerous electrical shock. Damage to the power supply or to the welding apparatus control box may also ensue.

The welding procedure for a welding apparatus of the invention will now be described.

To set-up the apparatus 10 of the invention for weld built-up of a surface to be repaired, the following steps may be taken.

Support rails are position relative to the bore 34. The axial position of the support rails is determined by the line bar 14 to be used, and the length and location of the bore to be built up. Support rails should be securely anchored, stable and capable of supporting the welding apparatus.

Screw a lifting eye 274 into the threaded hole in the spindle 24 located at the top of the head assembly 12. The lifting eye should be screwed into the threaded hole until the eye shoulder bottoms out on the spindle, and then tightened.

Make sure that the two clamping screws 276 located in the coupling 38 are retracted so that they do not protrude beyond flush with the taper. Use a hex wrench to turn the screws.

Attach the head assembly 12 to the mounting plate assembly 23 by lowering the head assembly through the center hole 278 in the mounting plate assembly (FIG. 4). Be sure to back out the centering adjustment screws 280. Clamp the head assembly tightly in place with the four mounting plate hold-down assemblies 176 (only one is shown). Center the head assembly on the mounting plate with the adjustment screws 280.

Attach the head assembly 12 to the line bar 14, which should already have the step assembly 16 and traveling assembly 18 attached, by lowering the head and mounting plate assembly 12/23 onto the line bar so that the tapered end 14' of the line bar 14 (FIG. 10) is inserted into the head assembly coupling 38, making sure that the angular orientation is correct to allow direct electrical and gas connection. Once fully inserted, tighten both clamping screws 276 using a hex wrench. Do not over tighten. Also insert the safety pin 282 into the cross hole 284.

Select the appropriate radial rod 106 based on the diameter of the bore to be built up. Insert the radial rod to be used into the rod holder 104 at the bottom of the traveling assembly 18. The rod 106 should be approximately centered in the rod holder to reduce the chances of the rod being damaged when the apparatus is lowered into the bore to be welded.

The assembled apparatus should now be lowered into the bore to be welded, and set on the support rails referred to above, with two of the leveling screws 286 (FIG. 4) on one rail, and a third leveling screw on the second rail (only one is shown). The apparatus should also be positioned so that the mounting plate assembly is central to the bore within 1 inch (2.5 cm).

Connect the control box power cable 288 (FIG. 9) into an adequately grounded 110 v, 60/50 Hz receptacle and the other end into the control box 178. Also connect the control box to the apparatus by means of the control cable 290. Connect an upper retractile cord to the connector located on the head assembly coupling (FIG. 2A). Turn the control box on by depressing the power button 254. The LED 256 in the switch will illuminate in the ON position. The function switch on the side of the box should be in the Normal position.

Proper alignment of the apparatus 10 requires that it be parallel to the axis of the bore (parallelism), and that it be centered in the bore (centrality). Parallelism can be achieved in several ways.

Method #1. Jog the radial 106 arm so that it is parallel to a line drawn between two of the leveling screws 286 (position #1) and adjust either or both of the leveling screws until the distance from the radial rod to the bore does not change as the machine is jogged axially. Next, move the annular position of the radial rod 90° so that it is parallel to a line between the third leveling screw 286 and the center of the apparatus (position #2). Again jog the machine axially, this time adjusting the third leveling screw, until the distance from the radial rod to the bore does not change during the jog. Return to position #1 and make whatever minor adjustment is necessary by again jogging axially and measuring the distance to the bore. Finally, return to position #2 and adjust if necessary.

Method #2. Similar to Method #1, except instead of measuring the distance from the radial rod 106 to the bore 36, measure from the radial rod to a face perpendicular to the bore axis, or a step or groove within the bore. This method is especially appropriate when the bore is large in diameter and/or not very deep. As with Method #1, position the radial rod so that it is parallel to a line drawn between two of the leveling screws 286. At this time, the radial rod will not likely be centered in its holder, but adjusted to one side so that measurement to the reference surface/groove is easier. Once measured, slide the radial rod in its holder so that a measurement from the opposite side of the bore can be taken. Adjust the two leveling screws 286 until the measurements on both sides of the bore are the same. Rotate the radial rod approximately 90° so that the measuring point is in line with the third leveling screw 286 and the center of the apparatus. Adjust the third leveling screw until the distance from the radial rod 106 to the reference surface/groove is equal to the measurement for the other two locations. Check at other angular locations to make sure that the measurement is the same everywhere. If not, adjustment of only the third leveling screw should be necessary.

Method #3. If the bore can be leveled, i.e., the axis of the bore made vertical, do so, and level the apparatus to match. Appropriate surfaces to level from are the line bar 14 or the head flange 22. Following leveling, a check of distance from the radial rod 106 to the bore surface 36, as with Methods #1 and #2, assure that the leveling is adequate.

Centrality, the other component of alignment, can be achieved by loosening the four clamp brackets 176, and using opposing jack screws 280 to move the entire apparatus radially to a central position. (It is assumed at this point that the apparatus has been centered to within 1 inch, e.g. using a steel tape measure). It is helpful, when making the final centrality adjustment, to position the radial rod 106 so it is parallel to the direction of adjustment. By rotating the rod 180°, it can easily be seen if, in this axis of adjustment, the apparatus is centered by measuring distance to the bore surface 36. Repeat this procedure with the other two opposed jack screws 280 to complete the centrality adjustment. Fasten the clamping brackets 176 before continuing.

Once alignment has been completed, the end support bearing 148 can be attached to the part or other rigid object. When doing so, take care not to move the line bar 14 out of its central position. The bearing should not be clamped to the line bar but should float axially.

If not already attached, attach the torch adjustment assembly and the torch 64 to the radial rod 106, and connect the power cable 116' to the rotating power connector 72 by means of the quick coupling 292.

Attach the "plus" (+) lead from the power supply to the quick coupling 294 near the red shroud. Connect the control box 178 to the power supply by use of the appropriate control cable. Attach the power supply ground lead (−) to a clean section of the part to be welded using a clamp or other method which will assure good electrical conductivity.

If the apparatus support is not touching the part to be built up, or if a poor electrical path exists between the apparatus and the part, run a wire or other conductive material between the part and apparatus to assure proper voltmeter operation.

If not already attached, put the appropriate wire feed conduit 130 in place between the torch 64 and wire feeder 100.

Put the wire spool 102 on the spool-holder 194, release the pressure on the wire feeder clamp rolls 296 and feed the wire by hand into the wire feeder 100 and under the clamp rolls 296. After clamping the rolls, use the WIRE FEED/JOG switch 240 forward to feed the wire through the conduit 130 and to the torch 64.

Position the torch 64 at the desired distance from and angle to the bore surface 36. Take care that the torch nozzle 142 is not touching the bore surface at any location since the standard nozzle is electrically "live".

Clearance between the nozzle and bore should generally be 0.2 to 0.5 inch (5 to 13 mm).

Using the AXIAL JOG button 228, jog the torch 64 axially to the desired start location. The wire 118 can be extended to determine the exact contact location and then retracted by depressing the WIRE FEED/JOG switch 240 in reverse.

Attach one end of the gas hose to a regulated shielding gas supply and the other end to the gas hose receiver plug located on the side of the shroud 168.

Depress the ROTATION INITIALIZE switch 258 to cause the torch to rotate until the "Start" position is reached.

Set the ROTATION/SPEED dial 236 to the proper setting for the diameter of the bore surface 36 to be built up. Also set the STEP SIZE knob 225 to the desired setting. It is generally wise to set the step size for the first step to be slightly shorter than subsequent steps, especially for vertical axis welding, due to the lack of a shelf for the first bead to rest on and the resultant sagging. The step size can he checked by pressing the STEP/CYCLE button 260.

The procedure for non-programmed welding will now be described.

Turn on the welding POWER supply button 254 and open the shielding gas valve. Depress the PURGE switch 246 to clear unwanted gases from the system. Depress the WELD switch 262 to start welding.

During welding, adjustments to the arc voltage (dial 250), step size (dial 225), wire feed speed (dial 242) and rotation speed (dial 236) can be made, and will likely have to be made, during the first two or three revolutions because a lower current and travel speed are generally necessary until a shelf of weld metal is created.

If there are locations within the bore 34 where buildup should not occur (e.g., a grease hole), depress the ARC INTERRUPT switch 264 at entry into those areas, and release the switch upon exit from those areas. Doing so will prevent wire 118 from feeding, deactivate the power supply contactor and shut off the gas within the area where buildup is not to occur. Manual interruption of the arc as described here can be done at any location or any number of times during the rotation of the torch.

To stop welding, depress the WELD switch 262.

The procedure for programmed welding (continuous rotation) will now be described.

The control box 178 can be programmed to interrupt the welding at up to 16 locations during each revolution. The length of each interruption can be for as long or short a duration as necessary. The locations of the interrupts and resumptions of welding can be set, changed or canceled before welding begins or during the welding. Before setting interrupts or resumes as described below, the PIE SHAPE/NORMAL switch 268 must be in the NORMAL position.

To set an interrupt location before welding begins, rotate the torch 64 using the JOG switch 232 to travel in the same direction that the welding will take place to the first interrupt location, and depress the INTERRUPT switch 266 for the PROGRAM ARC INTERRUPTS function (266). An INTERRUPT marker is placed in memory for this location.

Continue rotating the torch 64 to the location where the welding is to be resumed and depress the RESUME switch 270. A RESUME marker is placed here.

This procedure should be repeated for each location where the welding should not occur. If editing is necessary, the DELETE NEXT switch 272 will delete the next change-of-state marker, either an ARC INTERRUPT or RESUME marker, which would be encountered in the direction of rotation. This switch can be used when correcting a change-of-state location by depressing it before coming to the incorrect location, and resetting the change-of-state at the correct location when reached. Elimination of arc interruption at a given location is also accomplished by depressing the DELETE NEXT switch 272 before coming to the ARC INTERRUPT location. Depression of the DELETE NEXT switch 272 a second time will eliminate the RESUME marker that followed the previously eliminated INTERRUPT marker (or it will be automatically deleted for you). Note: Any change-of-state markers not paired with an opposite change-of-state marker will automatically be eliminated by the control after one revolution of the torch. Also, all markers are eliminated if power is lost to the control or if the power switch is turned OFF.

When welding is started (following setting as described above), welding will be interrupted and resumed as set, for each revolution of the torch.

To set, alter or eliminate programmed ARC INTERRUPTS during welding, follow the same procedure as described above for setup previous to welding.

The procedure for programmed welding (pie shaped mode) will now be described.

This capability allows automatic welding of less than 360° with alternating clockwise (CW), counter-clockwise (CCW) rotation of the torch. (As described above, CW/CCW directions referred to are as viewed from the head end of the welding apparatus.) Before the end points of welding in the PIE SHAPE Mode are set, the PIE SHAPE/NORMAL switch 268 must be in the PIE SHAPE position.

To set the edges of the "pie" before welding, position the torch 64 at the extreme CCW location and depress the INTERRUPT switch 270. To set the extreme CW location, position the torch 64 at that location, and depress the RESUME switch 270.

To initiate welding, position the torch 64 outside of the "pie", and depress the WELD switch 262, making sure that the ROTATION direction switch 234 is in the appropriate position (CW or CCW) to provide the shortest travel to the area to be welded. Once the torch 64 passes the area marker, welding will start.

To set the edges of the "pie"during welding, position the torch 64 at the extreme CCW edge, depress the INTERRUPT switch 270, and then the WELD switch 262. Welding will start and continue until the RESUME switch 270 is depressed. This will define the extreme CW edge of the "pie", and complete programming.

To alter the edges of the "pie" during welding, depress the DELETE NEXT switch 272 while approaching the edge to be altered, and then depress the appropriate edge defining switch 270, either INTERRUPT for the extreme CCW edge or RESUME for the extreme CW edge, when the desired new edge location is reached.

Thus according to the invention, the MIG (Metallic Inert Gas) welding process is employed, using electric welding current, metallic welding wire, and shielding gas at the point of welding.

In the preferred embodiment, a weld bead is generated by continuous rotation about the axis of the bore of a welding torch held in close proximity to the inside of the stationary bore. According to the invention, the weld beads are circular and planar for nearly 360°. Then, while continuing the rotation and the welding, an axial motion is commenced, stepping the weld bead to a new position that is contiguous with the bead just deposited, an incremental axial motion referred to as a "step". The welding continues forming another circular bead again with a step to the next contiguous bead position. This is a continuous process in which the rotation of the torch and the welding continue uninterrupted and the intermittent step is performed at the same preset point in rotation each revolution. The consequence of the above described motion is the formation of a fused cylindrical shell composed of parallel planar beads of weld that are also fused to the bore surface.

When the process is complete, the welding apparatus 10 of the invention will have used an electric arc to fuse a cylindrical layer of weld metal, melted from a continuous wire, to the interior surface of rotation of a metallic bore for at least a portion of its entire length. The end result is as if the entire part were foundry recast with a smaller bore size. The weld build-up, in most instances, will be from 0.100 to 0.300 inch thick, but greater or lesser thickness may be applied. For still greater thickness, one or more additional layers may be added.

Other embodiments are within the following claims. For example, the welding apparatus of the invention can also be used for surface repair of smaller bores by mounting the apparatus outside the bore to be built-up and reaching into the bore with a small torch. In this manner, the torch is the only part of the apparatus that must actually enter the bore.

The apparatus may be employed to apply a weld bead in a manner to form a full, circumferential layer upon the surface of the bore, or, as described above, it may be programmed to interrupt the bead in order to form one or more keyways, e.g. for lubrication slots, or to apply the bead over only a limited arc, perhaps in a back-and-forth motion, to form a patch build-up. The speed of torch rotation may be alternated, e.g. with the torch rotated at a significantly higher speed when no bead is being applied, for improved efficiency.

As an alternate embodiment of the welding apparatus of the invention, a step switch that is activated once each revolution by a spindle detent may be replaced by a rotary encoder coupled to the spindle in a 1-to-1 relationship. The encoder would have a marker pulse that would be sent out once during each revolution at which time the step sequence would be initiated. The encoder would also allow the control box to always know the rotational position of the welding torch. For example, the encoder may have 4096 pulses per revolution read by an on-board micro-processor. The processor will then determine he position of the torch with accuracy to within 1/4096 of a revolution. The processor may then be programmed to interrupt the arc at a predetermined point in rotation and then to reestablish the arc at another predetermined point. The processor may continue to interrupt the arc during each revolution at the same predetermined point, e.g. welding may be interrupted at an axial slot in the bore to form a keyway. The processor may be programmed with a number of interrupt-and-resume in order to skip over areas where welding is not needed, e.g. at lubrication slots.

The processor may also be programmed with a pair of interrupt-and-resume markers that signal the welding machine to travel in one direction until a marker is reached, then stop rotation and interrupt the arc, step axially to the next level, and then resume the welding rotation, but in the opposite direction. In this manner, welding would proceed axially up the bore as a series of separate weld beads, with the welding head traveling back and forth within the circular arc bounded by the interrupt-and-resume markers, e.g. in order to provide a build-up layer in a limited region requiring a patch.

Control functions may also be provided to automatically increase the rotational speed of the welding apparatus when it enters the interrupt mode, and decreasing the speed again to the pre-set welding rotational speed as it re-enters the welding mode. As a result, the cycle time may be reduced for improved efficiency by reducing the time that the welding machine is required to be operated in at the relatively slower welding speed.

A STEP/AUXILIARY switch may be provided to allow the apparatus to be fitted with additional motors which perform two different types of functions. The normal mode of operation for the apparatus, not equipped with additional motors, would ordinarily dictate that this switch be in the STEP position. This allows the control box switches to control the STEP function as described above. Also, with the switch in this position, and through the use of a control cord running between the control box and an auxiliary control box containing an additional motor drive and control components, another continual duty motor such as a second wire feed motor could be added, controlled by the auxiliary control box and properly interfaced with other control functions. When operating with two wire feeders such as described herein, both feeders will be stopped and started by the programmed INTERRUPT-/RESUME markers. Manual independent interruption of the additional wire feeder would be possible by depressing a switch located on the auxiliary control box. In the AUXILIARY position, and with a similarly configured control cord and auxiliary control box, a motor requiring activation every revolution, such as a face welding attachment would require, could be added. In this instance, this second motor would be controlled by switches and circuitry in the control box which normally control the axial step motor, and the step motor would be controlled by the auxiliary box. With the switch in this position, the step motor would not be capable of automatically stepping each revolution, but could be jogged by depressing switches in the auxiliary control box.

For build-up of larger diameter surfaces, e.g. in a paper mill digester having a diameter of 144 inches, the housing 20 may be mounted within the bore, e.g. on channel beans welded across the inner diameter of the bore, with the housing spaced from the internal surface 36 to be repaired.

The apparatus may further include a radial travel motor for build-up of face surfaces, e.g. using a method including the steps of: (a) holding the workpiece fixed against movement; (b) rotating an orbital welding torch in a circular path about the surface in an amount equal to about 360° around the surface to a limit point while at the same time continuously feeding weld wire from a source of wire and electrical power to the torch to form a substantially circular weld bead upon the surface; (c) immediately stepping the torch in a radial direction upon the torch reaching the limit point for a distance equal substantially to the width of the circular weld bead while at the same time continuing to rotate the torch and continuing to feed the wire and electrical power to the torch; (d) rotating an orbital welding torch in a circular path in an amount slightly less than 360° around the surface to a limit point while continuously feeding weld wire and electrical power to the torch to form a substantially circular weld bead upon the surface; (e) thereafer repeating step (c); (f) repeating step (d) and (c) as desired; and (g) lastly, repeating step (b).

The apparatus and method may further be used for weld buildup upon a concave surface of a workpiece, by stepping the torch in a direction having both radial and axial components upon the torch reaching the limit point, for a distance equal substantially to the width of the circular bead upon the surface.

What is claimed is:

1. An apparatus for weld build-up on a surface of revolution within a bore, comprising
    a head assembly comprising
        a housing defining a chamber having an axis, said housing adapted for fixed mounting in a region spaced from a surface of revolution, with the axis of said chamber in alignment with an axis of revolution, and
        a spindle mounted for rotation within said chamber, coaxial with said axis of revolution,
    an elongated line shaft coupled to said spindle and extending for coaxial rotation within said bore in a region of said surface of revolution,
    a step assembly fixedly mounted upon said line shaft, and
    a traveling assembly mounted upon said line shaft and disposed for rotation within said bore, said traveling assembly comprising
        a wire reel,
        a wire feeder, and
        an electrical welding torch assembly that terminates in a torch nozzle,
    said step assembly and said traveling assembly fixed for rotation upon said line shaft within said bore, and
    said welding apparatus further comprising means for adjustment of the axial spacing between said step assembly and said traveling assembly along said line shaft.

2. The welding apparatus of claim 1 wherein said means for adjustment of the axial spacing between said step assembly and said traveling assembly along said line shaft comprises a threaded rod fixed axially relative to said step assembly, and a threaded nut fixedly mounted to said traveling assembly, said rod disposed in threaded engagement with said nut.

3. The welding apparatus of claim 2 wherein said step assembly further comprises a step motor for rotation of said threaded rod in a manner to adjust the axial position of said traveling assembly relative to said step assembly, along said line shaft.

4. The welding apparatus of claim 2 or 3 wherein said step assembly further comprises a step clamp for releasably securing the axial position of said step assembly along said line shaft and said traveling assembly further comprises a traveling clamp for releasably securing the axial position of said traveling assembly along said line shaft, whereby, during weld build-up, said step clamp is engaged and said traveling clamp is disengaged and rotation of said threaded rod causes movement of said traveling assembly along said line shaft, and, during set-up, said step clamp is disengaged and said traveling clamp is engaged and rotation of said threaded rod causes movement of said step assembly along said line shaft.

5. The welding apparatus of claim 1 further comprising means for introducing welding current from an external source to said torch assembly.

6. The welding apparatus of claim 5 wherein said means for introducing welding current comprises a power connector assembly disposed about said spindle, said power connector assembly comprising
    a first, electrically conductive, non-rotatable power connector element joined to said housing and defining a first electrically conductive surface, and
    a second, electrically conductive, rotatable power connector element joined to said spindle and defining a second electrically conductive surface opposed to and in electrically-conductive engagement with said first surface at an electrically conductive interface,
    means for connecting said first, non-rotatable power connector element to a fixed, external source of electrical welding current, said current passing from said first power connector element to said second power connector element by way of said interface, and
    means for delivering welding current from said second, rotatable power connector element to said torch assembly.

7. The welding apparatus of claim 6 wherein said head assembly further comprises means for electrically insulating said housing from said power connector assembly.

8. The welding apparatus of claim 1 further comprising means for introducing inert gas from an external source to said torch assembly.

9. The welding apparatus of claim 8 wherein said means for introducing inert gas comprises
    a first, non-rotatable power connector element joined to said housing, and
    a second, rotatable power connector element joined to said spindle,
        said first power connector element defining an inlet port for connection to an external supply of gas,
        said second power connector element defining an outlet port for supply of the gas to said torch assembly, and
        said first power connector element and said second power connector element together defining a cavity connecting said inlet port to said outlet port.

10. The welding apparatus of claim 9 wherein said head assembly further comprises means for urging together said first power connector element and said second power connector element in a manner to secure said interface against leakage of the inert gas.

11. The welding apparatus of claim 10 wherein said means for urging comprises a compression spring disposed about said spindle.

12. The welding apparatus of claim 1 wherein said head assembly further comprises means for passing at least one electrical circuit into said rotating spindle, said means for passing comprising a slip ring mounted upon said spindle and a brush mounted upon said fixed housing.

13. The welding apparatus of claim 1 wherein said head assembly further comprises a motor for driving said spindle.

14. The welding apparatus of claim 1 wherein said line shaft defines a keyway and said step assembly defines a key engaged in said keyway in a manner to cause said step assembly to rotate with said line shaft within said bore.

15. The welding apparatus of claim 1 or 14 wherein said line shaft defines a keyway and said traveling assembly defines a key engaged in said keyway in a manner to cause said traveling assembly to rotate with said line shaft within said bore.

16. The welding apparatus of claim 1 wherein said torch assembly comprises a rod mounted in a clamp and extending generally radially of the axis of said line shaft, said welding torch nozzle mounted upon said rod and adapted for positioning adjacent a surface to be repaired.

17. The welding apparatus of claim 16 wherein said clamp, in a first position, permits movement of said rod radially for coarse adjustment of the position of said torch nozzle relative to the surface to be repaired, and in a second position fixes the coarse adjustment position of said torch nozzle.

18. The welding apparatus of claim 16 or 17 wherein said rod defines a multi-tooth rack, and said torch assembly further comprises a block disposed for movement axially along said rod, and a pinion gear mounted within said block in engagement with said rack and connected to an external knob, whereby said welding torch nozzle, mounted upon said block, is movable along said rod by rotation of said knob to fine adjust the position of the welding torch nozzle relative to the surface to be repaired.

19. A coupling for axially joining a first shaft and a second shaft, said coupling comprising:

a coupling body, said coupling body defining a first axial bore sized and adapted for receiving an end of the first shaft, and a second axial bore sized and adapted for receiving an end of the second shaft, at least said second axial bore being tapered, and said coupling body defining a cross hole bore intersecting a base region of the tapered second axial bore, and a knockout pin disposed within said cross hole bore for movement between a first position and a second position, and a spring, said knockout pin defining a radial flange and said spring being disposed about said knockout pin, between said flange and an opposed surface of said coupling body, said spring adapted to urge said knockout pin toward said first position, said knockout pin further defining a shoulder surface disposed for engagement with an opposed surface of said coupling body for limiting movement of said knockout pin toward said first position, and said knockout pin further defining a ramping surface adapted to engage a surface of the shaft disposed within said second axial bore when said knockout pin is moved from said first position toward said second position, in a manner to urge the second shaft and said coupling to separate.

20. The coupling of claim 19 wherein said cross hole bore has a first hole portion of a first diameter and a second hole portion of a second, relatively smaller diameter, and said knockout pin comprises a first pin portion disposed generally in said first hole portion, and a second pin portion disposed generally in said second hole portion, said first pin portion defining said radial flange, said second pin portion defining said shoulder surface disposed for engagement with the opposed surface of said coupling body, and said first pin portion further defining said ramping surface adapted to engage a surface of the shaft disposed within said second axial bore when said knockout pin is moved from said first position toward said second position, in a manner to urge the second shaft and said coupling to separate.

21. The coupling of claim 19 or 20 wherein the surface the second shaft disposed within said second axial bore defines a circumferential groove, said coupling defines a second cross hole intersecting a region of the groove and tangent to a surface of the groove of the shaft, and said coupling further comprises a safety pin adapted to be placed within said second cross hole to interfere with separation of the second shaft and said coupling.

22. The coupling of claim 21 wherein said coupling body further defines one or more transverse threaded bores intersecting said second axial bore in the region of the groove, said one or more transverse threaded bores disposed at an acute angle to the axis of said coupling, said coupling further comprising one or more set screws disposed in said bores, in engagement with a surface of the groove, in manner to resist separation of the shaft and said coupling.

23. The coupling of claim 21 wherein said ramping surface is removed from said second axial bore when said knockout pin in is said first position.

24. The coupling of claim 21 wherein said first axial bore is threaded, said first shaft is a hollow spindle defining a conduit for one or more electrical wires, and said coupling body defines a transverse conduit intersecting said first axial bore and providing a conduit for said electrical wires from within said spindle.

25. A method of weld buildup upon a substantially flat surface of a workpiece comprising the steps of:

(a) holding the workpiece fixed against movement;

(b) rotating an orbital welding torch in a circular path about the surface in an amount equal to about 360° around the surface to a limit point while at the same time continuously feeding weld wire from a source of wire and electrical power to the torch to form a substantially circular weld bead upon the surface;

(c) immediately stepping the torch in a radial direction upon the torch reaching said limit point, for a distance equal substantially to the width of the circular weld bead, while at the same time continuing to rotate the torch and continuing to feed the wire and electrical power to the torch;

(d) rotating an orbital welding torch in a circular path in an amount slightly less than 360° around the surface to a limit point while continuously feeding weld wire and electrical power to the torch to form a substantially circular weld bead upon the surface;

(e) repeating step (c);

(f) repeating step (d) and (c) as desired; and (g) lastly, repeating step (b).

26. A method of weld buildup upon a concave surface of a workpiece comprising the steps of:

(a) holding the workpiece fixed against movement;

(b) rotating an orbital welding torch in a circular path about the surface in an amount equal to about 360° around the surface to a limit point, while at the same time continuously feeding weld wire from a source of wire and electrical power to the torch to form a substantially circular weld bead upon the surface;

(c) immediately stepping the torch in a direction having both radial and axial components upon the torch reaching said limit point, for a distance equal substantially to the width of the circular weld bead upon the surface, while at the same time continuing to rotate the torch and continuing to feed the wire and electrical power to the torch;

(d) rotating an orbital welding torch in a circular path in an amount slightly less than 360° around the surface to a limit point while continuously feeding weld wire and electrical power to the torch to form a substantially circular weld bead upon the surface;

(e) repeating step (c);

(f) repeating step (d) and (c) as desired; and (g) lastly, repeating step (b).

* * * * *